(12) United States Patent
Hampton

(10) Patent No.: US 8,418,550 B2
(45) Date of Patent: Apr. 16, 2013

(54) METHOD AND APPARATUS FOR CAPACITIVE SENSING THE TOP LEVEL OF A MATERIAL IN A VESSEL

(75) Inventor: Steven W. Hampton, Mustang, OK (US)

(73) Assignee: Little Giant Pump Company, Oklahoma City, OK (US)

( * ) Notice: Subject to any disclaimer, the term of this patent is extended or adjusted under 35 U.S.C. 154(b) by 540 days.

(21) Appl. No.: 12/645,137

(22) Filed: Dec. 22, 2009

(65) Prior Publication Data

US 2010/0154534 A1 Jun. 24, 2010

Related U.S. Application Data

(60) Provisional application No. 61/140,511, filed on Dec. 23, 2008.

(51) Int. Cl.
*G01F 23/26* (2006.01)

(52) U.S. Cl.
USPC ........................................ 73/304 C; 73/290 R

(58) Field of Classification Search ................ 73/304 C, 73/290 R
See application file for complete search history.

(56) References Cited

U.S. PATENT DOCUMENTS

| | | | |
|---|---|---|---|
| 4,201,085 A | 5/1980 | Larson | |
| 4,345,879 A | 8/1982 | Steiner | |
| 4,540,342 A | 9/1985 | Steiner et al. | |
| 4,603,581 A | 8/1986 | Yamanoue et al. | |
| 4,621,657 A | 11/1986 | St. Ledger | |
| 4,716,536 A * | 12/1987 | Blanchard | 702/100 |
| 4,742,244 A | 5/1988 | Koerner | |
| 5,056,588 A | 10/1991 | Carr | |
| 5,058,421 A | 10/1991 | Alexander et al. | |
| 5,076,763 A | 12/1991 | Anastos et al. | |
| 5,145,323 A | 9/1992 | Farr | |
| 5,187,979 A * | 2/1993 | Edmark, III | 73/304 C |
| 5,197,329 A | 3/1993 | Grundy | |
| 5,216,288 A | 6/1993 | Greene | |
| 5,238,369 A | 8/1993 | Farr | |
| 5,297,939 A | 3/1994 | Orth et al. | |
| 5,314,313 A | 5/1994 | Janesky | |
| 5,324,170 A | 6/1994 | Anastos et al. | |
| 5,374,380 A | 12/1994 | James | |
| 5,450,067 A | 9/1995 | Wang | |
| 5,545,012 A | 8/1996 | Anastos et al. | |
| 5,549,456 A | 8/1996 | Burrill et al. | |
| 5,562,422 A | 10/1996 | Ganzon et al. | |
| 5,576,582 A | 11/1996 | White | |
| 5,850,175 A | 12/1998 | Yeilding | |
| 5,927,950 A | 7/1999 | Juvenal | |
| 6,056,886 A | 5/2000 | Hickok, Jr. et al. | |
| 6,158,064 A | 12/2000 | Downs | |

(Continued)

OTHER PUBLICATIONS

Little Giant VCMA-20 Series, Franklin Electric Company, Inc., 2003 (2 pages).

(Continued)

*Primary Examiner* — Hezron E Williams
*Assistant Examiner* — Rodney T Frank
(74) *Attorney, Agent, or Firm* — Faegre Baker Daniels LLP

(57) ABSTRACT

A method and apparatus for sensing the top level of a material in a vessel is disclosed. A method and apparatus for sensing changes in the top level of a material in a vessel is disclosed.

34 Claims, 21 Drawing Sheets

U.S. PATENT DOCUMENTS

| | | |
|---|---|---|
| 6,334,360 B1 | 1/2002 | Chen |
| 6,336,348 B1 | 1/2002 | Lee et al. |
| 6,336,469 B1 | 1/2002 | Nixon et al. |
| 6,390,780 B1 | 5/2002 | Batchelder et al. |
| 6,480,113 B1 | 11/2002 | Esposito |
| 6,499,961 B1 | 12/2002 | Wyatt et al. |
| 6,534,947 B2 | 3/2003 | Johnson et al. |
| 6,663,349 B1 | 12/2003 | Discenzo et al. |
| 6,676,382 B2 | 1/2004 | Leighton et al. |
| 6,679,286 B2 | 1/2004 | Kato et al. |
| 6,709,241 B2 | 3/2004 | Sabini et al. |
| 6,820,483 B1 | 11/2004 | Beckerman |
| 6,847,291 B2 | 1/2005 | Kemp |
| 6,998,807 B2 | 2/2006 | Phillips et al. |
| 7,044,714 B2 | 5/2006 | Bevan et al. |
| 7,112,037 B2 | 9/2006 | Sabini et al. |
| 7,114,391 B2 * | 10/2006 | Sasaki et al. ............. 73/304 C |
| 7,117,120 B2 | 10/2006 | Beck et al. |
| 7,191,649 B1 | 3/2007 | Coogle |
| 7,258,005 B2 * | 8/2007 | Nyce ............................ 73/304 C |
| 7,271,359 B2 | 9/2007 | Domzalski |
| 7,309,216 B1 | 12/2007 | Spadola, Jr. et al. |
| 7,318,344 B2 | 1/2008 | Heger |
| 7,382,139 B2 | 6/2008 | Mackey |
| 7,395,559 B2 | 7/2008 | Gibson et al. |
| 7,420,134 B1 | 9/2008 | Leary et al. |
| 7,452,190 B2 | 11/2008 | Bouton et al. |
| 7,453,224 B2 | 11/2008 | Sullivan |
| 7,739,907 B2 * | 6/2010 | Boiarski ......................... 73/149 |

OTHER PUBLICATIONS

Little Giant WCR-9SP, WCR-9SS, Franklin Electric Company, Inc., 2008 (2 pages).

Little Giant VCMA-10, VCMA-15, VCMA-20, Franklin Electric Company, Inc., 2009 (8 pages).

Little Giant CS-SS, Franklin Electric Company, Inc., 2006 (4 pages).

Wastewater Product Catalog, Franklin Electric Company, Inc., 2007 (67 pages).

* cited by examiner

METHOD AND APPARATUS FOR CAPACITIVE SENSING THE TOP LEVEL OF A MATERIAL IN A VESSEL

RELATED APPLICATIONS

This application claims the benefit of U.S. Provisional Patent Application No. 61/140,511, the disclosure of which is expressly incorporated by reference herein.

FIELD

The present invention relates to a method and apparatus for sensing a top level of a material in a vessel, and in particular to a method and apparatus for capacitive sensing the top level of a material in a vessel.

BACKGROUND

In the field of material transfer from one point to another, it is often desired to assess the level of material in a vessel in order to determine when to initiate a control event. These control events could include turning on a fluid transfer pump, opening valves or drains, or adding a material to the container. For liquids, as a reservoir of fluid becomes too high, some means is often used to transfer the fluid from the high reservoir to another location such as either another reservoir or to discharge the fluid into the environment.

A number of techniques have been utilized in the past to accomplish this goal. Each of these prior techniques has its disadvantages. For some technologies, a sensor must be in direct contact with the material to be sensed and may suffer from corrosion, chemical reaction or physical wear of the sensor, resulting in premature failure. For other technologies, the complexity and cost of implementation may be barriers to a cost-effective product.

In previous fluid systems a mechanical float has often been used whereby the float would actuate a lever arm and an electric switch, or other form of electrical contact. The float, being of a lower density than the fluid, would ride with the top surface of the fluid as it rises and falls. A mechanical linkage between the float and the switch may suffer from mechanical wear. Additionally the float must be made from a substance that is not attacked by the fluid. In some applications where the fluid is not homogeneous, such as sewage applications, the float may become tangled or blocked by materials dispersed in the fluid.

In systems using an optical emitter and receiver to 'see' the material, the sensor may be sensitive to variations in the clarity of the material. Over time, if algae slime is allowed to grow in the fluid reservoir, the algae may block the transmission of the beam of light and give false indications. If powder residue from a loose solid material is allowed to build up on an optical sensor, the emitter and/or receiver can become partially blocked and also cause false indications. Likewise, with infrared emitters and receivers, the surface of the sensors must be cleaned occasionally to have accurate transmission.

Ultrasonic technology has been used to reflect back from the surface of a material and sense the distance from the sensor to the surface of the material. These sensors require relatively expensive circuitry and microprocessor control to determine the distance based on the time it takes for an ultrasonic pulse to be emitted, hit the surface of the material, and bounce back to the source. If the surface of the material is agitated (particularly in fluids), reflections of the wave can bounce off at angles and then off the walls of the reservoir introducing error in the received waveform. It is quite common for a reservoir or basin to have the inflow of fluid at a high enough rate to cause waves and agitation of the surface of the fluid.

Conductive probes of stainless steel or similar metal are also commonly used. These metal probes are set at a specific vertical level, and when they contact a conductive material such as impure water, the water forms a conductive path between the probes and activates some other part of a circuit. These metal probes may suffer from corrosive or chemical attack by the fluid being sensed. These metal probes can also acquire a build up of contaminants on the surface that adversely affects the measurement. Some fluids may either vary in their conductivity or are not conductive at all and cannot be sensed accurately.

Other systems rely on sensing the pressure in a compartment or under a flexible diaphragm that is in contact with the fluid to be sensed. The amount of pressure sensed gives an indication of the height of the fluid above the contact point. These systems are highly sensitive to environmental temperature since the temperature also drastically affects the pressure in the compartment with the sensor. The flexible diaphragm can also be chemically attacked by the fluid or simply become aged and crack from continuous mechanical flexing.

SUMMARY

In an exemplary embodiment of the present disclosure, a method for sensing the top level of a material in a vessel is provided. In another exemplary embodiment of the present disclosure, an apparatus for sensing the top level of a material in a vessel is provided. In yet another exemplary embodiment of the present disclosure, a method for sensing changes in the top level of a material in a vessel is provided. In still another exemplary embodiment of the present disclosure, an apparatus for sensing changes in the top level of a material in a vessel is provided.

In an exemplary embodiment of the present disclosure, a method of controlling a level of a material in a vessel is provided. The method comprising the steps of: placing at least two capacitive sensors proximate to the material in the vessel, a first capacitive sensor arranged to monitor a first range of levels in the vessel and a second capacitive sensor arranged to monitor at least a first level in the vessel, the first level being a part of the first range of levels; monitoring an output of the first capacitive sensor; monitoring an output of the second capacitive sensor; and determining a current level of the material in the vessel based on the output of the first capacitive sensor and the output of the second capacitive sensor. The output of the second capacitive sensor being used to improve an accuracy of the determined current level. In one example, the first level is at an endpoint of the first range of levels. In another example, the first level is between a first endpoint and a second endpoint of the first range of levels. In yet another example, the method further comprises the step automatically adjusting an amount of material in the vessel based on the current level when the current level corresponds to a control event. In a variation thereof, the amount of material in the vessel is reduced when the current level corresponds to the control event. In a further variation thereof, a controller determines if the current level corresponds to the control event and in response thereto activates a material control device to reduce the amount of material in the vessel. In yet another variation thereof, the amount of material in the vessel is increased when the current level corresponds to the control event. In a further variation thereof, a controller determines if the current level corresponds to the control event and in response thereto activates a material control device to increase the amount of material in the vessel. In another example, the material is flowable material. In still another example, the material is fluid. In yet still another example, a controller determines if the current level corresponds to an alarm event and in response thereto provides an indication to an alarm device. In still a further example thereof, the controller includes an analog circuit and the step of monitoring an output of the first capacitive sensor includes the step of integrating a voltage associated with the first capacitive sensor over time. In yet still a further example, the controller includes an analog circuit and the step of monitoring an output of the second capacitive sensor includes the steps of integrating a voltage associated with the second capacitive sensor over time; comparing the integrated voltage to a threshold voltage. In a further example, the controller based on whether the integrated voltage crosses the threshold voltage determines a correction for a monitored voltage associated with the first capacitive sensor. In yet a further example, the first range of levels is a variable range. In a variation thereof, the method further comprises the step of setting an endpoint of the first range of levels based on at least one user input. In still a further example, the method further comprises the steps of powering up a power circuit when the current level approaches a level corresponding to a control event; and automatically adjusting an amount of material in the vessel based on the current level when the current level reaches the level corresponding to the control event. In yet still a further example, the method further comprises the steps of automatically adjusting an amount of material in the vessel with a material control device based on the current level when the current level has moved in a first direction and corresponds to a control event; determining if the current level continues to move in the first direction while the material control device is active; and if the current level continues to move in the first direction provide an indication to an alarm device.

In another exemplary embodiment of the present disclosure, a method of controlling a level of a material in a vessel is provided. The method comprising the step of placing at least three capacitive sensors proximate to the material in the vessel. A first capacitive sensor arranged to monitor a first range of levels in the vessel. A second capacitive sensor arranged to monitor at least a first level in the vessel. The first level being a part of the first range of levels. A third capacitive sensor arranged to monitor at least a second level in the vessel. The second level being a part of the first range of levels. The method further comprising the steps of monitoring an output of the first capacitive sensor; determining a level of the material based on the output of the first capacitive sensor; monitoring an output of the second capacitive sensor when the determined level is proximate to the first level in the vessel; monitoring an output of the third capacitive sensor when the determined level is proximate to the second level in the vessel; and determining a current level of the material in the vessel based on the output of the first capacitive sensor and at least one of the output of the second capacitive sensor when the determined level is proximate to the first level in the vessel and the output of the third capacitive sensor when the determined level is proximate to the second level in the vessel. The output of the second capacitive sensor and the output of the third capacitive sensor being used to improve an accuracy of the determined current level. In one example, the method further comprises the step automatically adjusting an amount of material in the vessel based on the current level when the current level corresponds to a control event.

In another exemplary embodiment of the present disclosure, an apparatus for controlling a level of a material in a vessel is provided. The apparatus comprising a first capacitive sensor arranged to monitor a first range of levels in the vessel; a second capacitive sensor arranged to monitor at least a first level in the vessel, the first level being a part of the first range of levels; a controller operatively coupled to the first capacitive sensor and the second capacitive sensor; and a material control device operatively coupled to the controller. The material control device having a first configuration wherein a fluid conduit external to the vessel is not in fluid communication with an interior of the vessel and a second configuration wherein the fluid conduit external to the vessel is in fluid communication with the interior of the vessel, the controller changing the configuration of the material control device based on an output of the first capacitive sensor and an output of the second capacitive sensor, the output of the second capacitive sensor being used to improve an accuracy of the determined current level. In one example, the material control device removes material from the interior of the vessel in the second configuration. In a variation thereof, the material control device is a pump. In another variation thereof, the material control device is a valve. In another example, the material control device adds material to the interior of the vessel in the second configuration. In a variation thereof, the material control device is a pump. In another variation thereof, the material control device is a valve. In another example, the apparatus further comprises a non-capacitive sensor arranged to monitor at least a second level in the vessel. The second level being a part of the first range of levels. In a variation thereof, the non-capacitive sensor is selected from the group of a mechanical float; a heat sensor; a conductive probe, and a pressure sensor. In a further variation thereof, the second level is spaced apart from the first level. In another variation thereof, the second level is equal to the first level.

Additional features and advantages of the present invention will become apparent to those skilled in the art upon consideration of the following detailed description of illustrative embodiments exemplifying the best mode of carrying out the invention as presently perceived.

BRIEF DESCRIPTION OF THE DRAWING

The above-mentioned and other features of the invention, and the manner of attaining them, will become more apparent and will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE DRAWINGS

Figure 1:
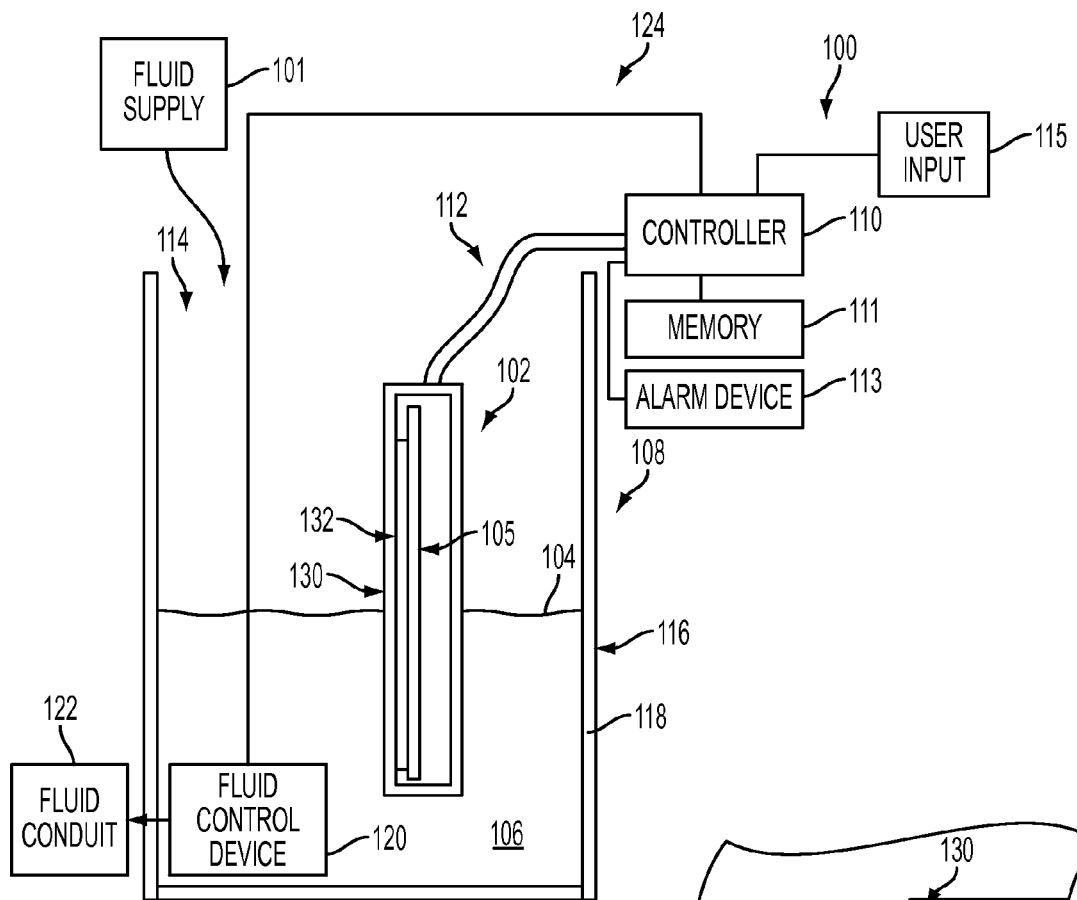
FIG. 1 illustrates a sensor module including a coplanar plate capacitive sensor positioned in a vessel containing a material.

Referring to FIG. 1, a control system 100 is shown. Control system 100 includes a sensor module 102 which monitors a top level 104 of a material 106 in a vessel 108. Exemplary materials include flowable products, such as liquids, gels, granular material, liquids with suspended solids, and other materials which may flow through a conduit. Exemplary liquids include water based liquids and fuel products. As described throughout this disclosure, material 106 is a fluid, such as water. However, the systems described herein may be used with any type of flowable product.

Control system 100 further includes a controller 110 which is operatively coupled to sensor module 102. In the illustrated embodiment, controller 110 is operatively coupled to sensor module 102 through wires 112. In one embodiment, controller 110 is operatively coupled to sensor module 102 through a wireless connection. Control system 100 monitors sensor module 102 and based thereon operates a fluid control device 120. Fluid control device 120 is shown as being operatively coupled to controller 110 through wires 124. In one embodiment, fluid control device 120 is operatively coupled to controller 110 through a wireless connection.

Fluid control device 120, as illustrated, controls the movement of material 106 from vessel 108. In one embodiment, fluid control device 120 is a valve which has a first configuration wherein an interior 114 of vessel 108 is in fluid communication with a fluid conduit 122 which is in fluid communication with the valve and a second configuration wherein the interior 114 of vessel 108 is not in fluid communication with fluid conduit 122. In one embodiment, fluid control device 120 is a pump which pumps material 106 from interior 114 of vessel 108 through fluid conduit 122 to another location. In one embodiment, fluid control device 120 controls the movement of material 106 from a fluid supply 101 to the interior 114 of vessel 108.

Fluid supply 101 may be any system that provides fluid to vessel 108. Exemplary fluid supplies 101 include groundwater, condensate from an air conditioning system, condensate from a gas furnace, rainwater runoff, a municipal water supply, and any other system which provides fluid.

Sensor module 102 is shown including a covering 130 which separates at least one sensor 132 from material 106. Covering 130 keeps material 106 from contacting sensor 132. Exemplary coverings 130 include plastic and other suitable non-conductive materials for creating a barrier between material 106 and sensor 132. In one embodiment, sensor 132 is separated from material 106 by placing sensor 132 on an exterior 116 of vessel 108. In this situation, covering 130 is the wall 118 of vessel 108.

Figure 2:
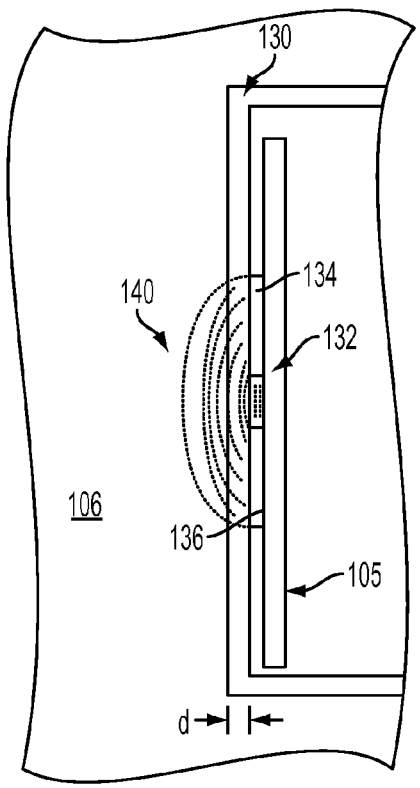
FIG. 2 illustrates a top view of the sensor module of FIG. 1.

Referring to FIG. 2, sensor 132 includes two spaced apart elements 134 and 136. Elements 134 and 136 are electrodes which form a capacitive sensor with material 106 serving as part of the dielectric of the capacitive sensor when material 106 is at a height in vessel 108 that material 106 is adjacent to at least a portion of element 134 and element 136. Sensing a material by measuring the capacitance of a sensor which has its electric field coupled with the material so that the material becomes a dielectric is known. Embodiments have been used that can sense the presence of a material versus the presence of air due to the relatively large difference in their dielectric constants (also referred to as relative permittivity). Air has a typical dielectric constant of 1.0, whereas a material such as water has a typical dielectric constant of about 79.

Many devices utilizing this capacitive effect have improved upon those of the past. These devices work well for sensing a material initially and may work well for many years in controlled environments. However, in some environments the sensor can begin to build up a coating of residue or contaminant or in the case of fluids such as water they can start to grow slime algae on the surface. Over time the base capacitance of the sensor changes since this added material changes the dielectric of the sensor. Normally this would add to the effective capacitance of the sensor when the material needing to be sensed is not present. When the material to be sensed is present the measured capacitance could have a positive or negative error depending upon the relative dielectric constant of the contaminant on the sensor versus the dielectric constant of the material to be measured. The sensitivity of discerning the material is also affected since the material is now farther from the sensor's electrodes.

A basic capacitor passes an alternating current (sine wave) from one electrode to the other electrode based on the equation:

$$I_C = V\omega C = 2V\pi f C$$

wherein
$I_C$=current through the capacitor, V=Voltage across the electrodes, $\omega$=angular frequency, $\pi \approx$Pi$\approx$3.14159, f=frequency of the alternating current, and C=capacitance.

Accordingly the amount of alternating current that can be passed through the capacitor for a given frequency is directly proportional to the capacitance. Capacitance is defined mathematically as C=Q/V where C is capacitance in Farads; Q is the amount of charge in Coulombs; and V is the voltage potential across the plates in Volts.

For two parallel plates in a vacuum, $C=\epsilon_0(A/d)$, where $\epsilon_0$=permittivity constant of free space ($8.85\times10^{-12}$ F/m); A=total plate area; and d=distance between the plates.

Since the capacitance is inversely proportional to the distance between the plates, through the dielectric, this distance is critical to the sensitivity of a capacitance sensor. It is much easier to sense an object close to the plates than far away from the plates. Therefore any build up of material on the surface of the sensor inhibits the measurement of material 106 and changes the value measured.

Returning to FIG. 2, a sensor 132 is formed based on the fringing field 140 between element 134 and element 136. In one embodiment, element 134 and element 136 are coplanar plates. The distance, 'd', is now the distance from the surface of elements 134 and 136 to the dielectric material to be sensed, namely the thickness of covering 130.

Figure 3:
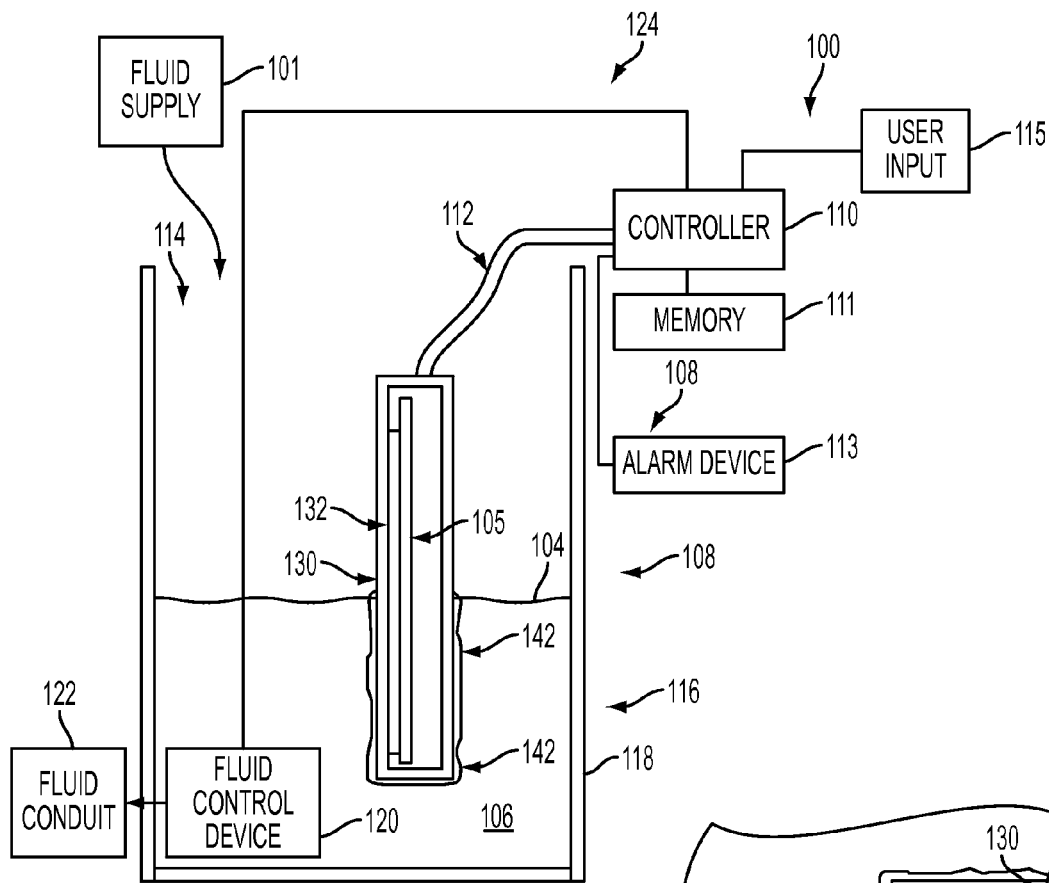
FIG. 3 illustrates the sensor module of FIG. 1 having a build-up of contaminant.
Figure 4:
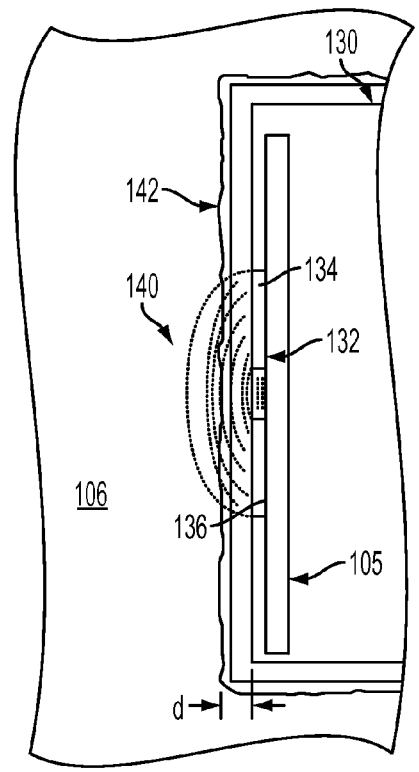
FIG. 4 illustrates a top view of the sensor module of FIG. 3.

Referring to FIGS. 3 and 4, a contaminant 142 is shown building up on the surface of covering 130. As contaminant 142 builds up, it adds to the dimension, 'd', as illustrated in FIG. 4. This buildup of contaminant 142 changes the output of sensor module 102 for a given level 104 of material 106. One solution to this problem is to require regular cleaning of the surface of covering 130. However, the present disclosure provides methods for calibrating out changes to the capacitance of sensor 132 due to contaminant over time as explained in conjunction with the exemplary sensor module 200 shown in FIG. 5.

Figure 5:
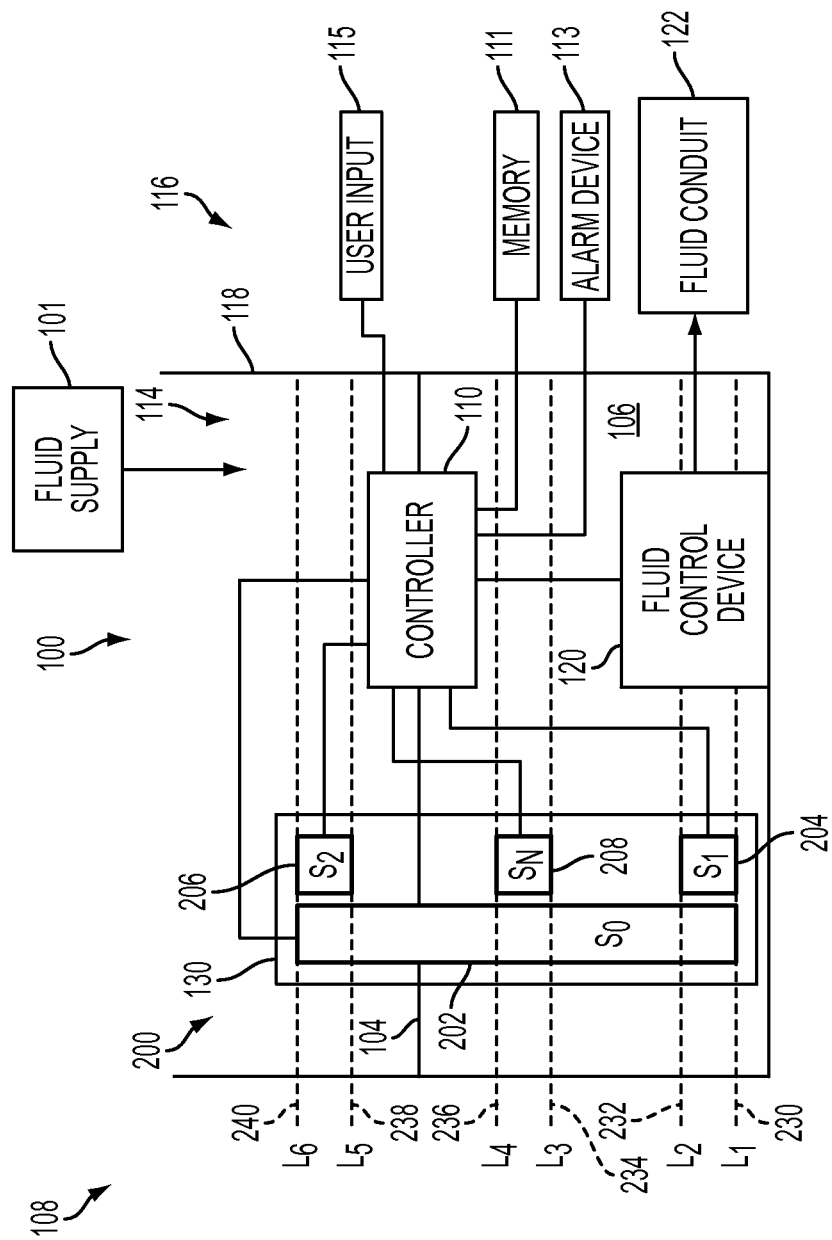
FIG. 5 illustrates a sensor module having a plurality of sensors positioned proximate to a material in a vessel, a controller coupled to the sensor module, and a fluid control device coupled to the controller.
Figure 6:
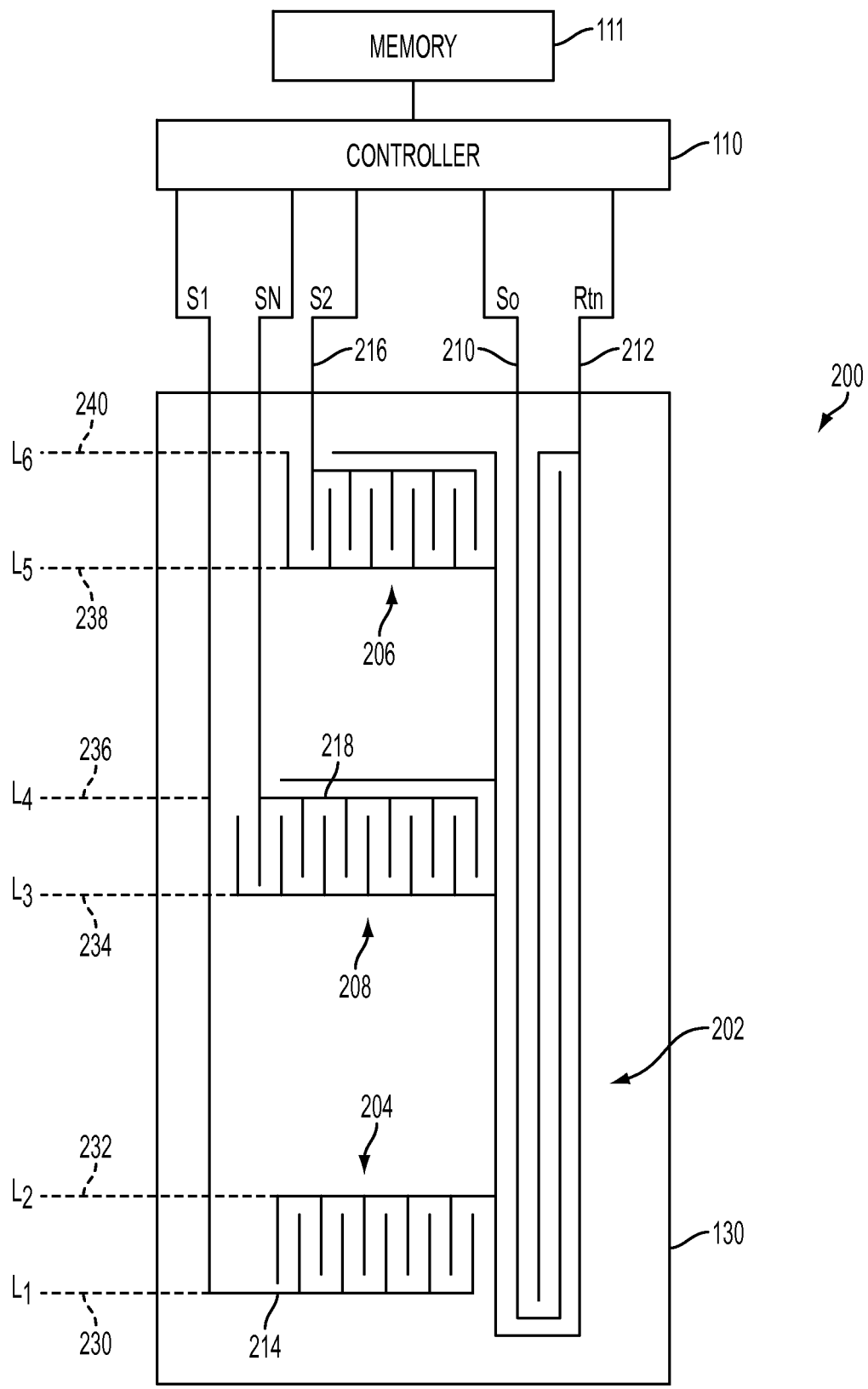
FIG. 6 illustrates an exemplary arrangement of the sensor module of FIG. 5.

Referring to FIG. 5, sensor module 200 includes a first capacitive sensor 202, a second capacitive sensor 204, a third capacitive sensor 206, and a fourth capacitive sensor 208. Each of capacitive sensors 202-208 monitors a given region of interior 114 of vessel 108. Referring to FIG. 6, an exemplary configuration of sensor module 200 is shown. Capacitive sensor 202 is comprised of a first element or electrode 210 and a second element or electrode 212 which are generally equidistant. Capacitive sensor 204 is comprised of a first element or electrode 214 and second element or electrode 212 which are generally equidistant. Capacitive sensor 206 is comprised of a first element or electrode 216 and second element or electrode 212 which are generally equidistant. Capacitive sensor 208 is comprised of a first element or electrode 218 and second element or electrode 212 which are generally equidistant. In the illustrated embodiment, each of sensors 202-208 share a common element, namely second element 212. In one embodiment, sensors 202-208 do not share a common element.

Further, although four sensors are illustrated more or less sensors may be included. In one embodiment, sensor module 200 includes at least two sensors which have overlapping monitoring regions. As indicated in FIGS. 5 and 6, capacitive sensor 202 generally monitors top level 104 of material 106 when top level 104 is between level 230 ($L_1$) and level 240 ($L_6$), capacitive sensor 204 monitors top level 104 of material 106 when top level 104 is between level 230 ($L_1$) and level 232 ($L_2$), capacitive sensor 206 monitors top level 104 of material 106 when top level 104 is between level 238 ($L_5$) and level 240 ($L_6$), and capacitive sensor 208 monitors top level 104 of material 106 when top level 104 is between level 234 ($L_3$) and level 236 ($L_4$).

Figure 7:
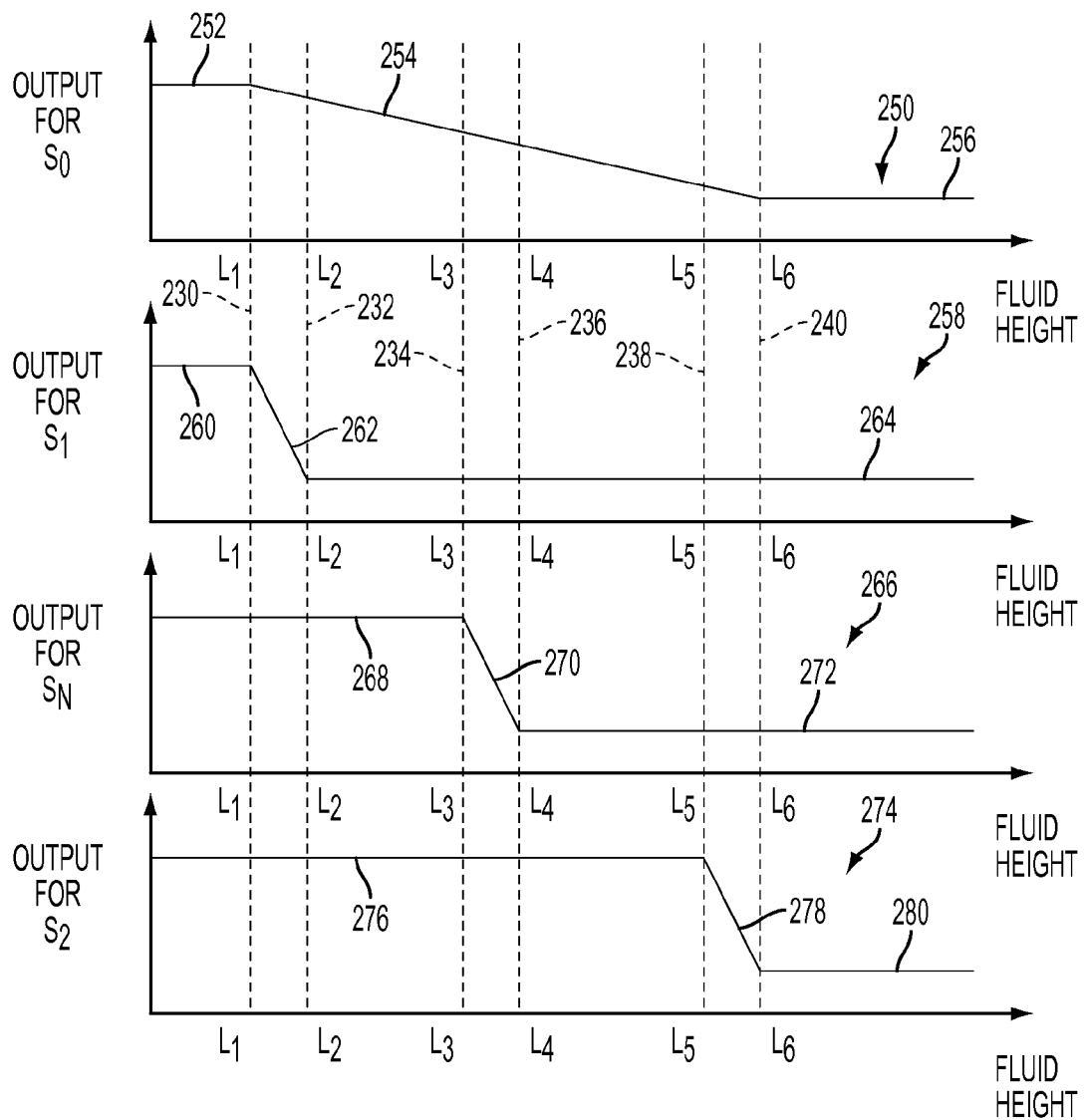
FIG. 7 illustrates exemplary outputs for each of the sensors of the sensor module of FIG. 5.

Referring to FIG. 7, an ideal output curve 250 for capacitive sensor 202 as a function of top level 104 of material 106 is shown. As shown, ideal output curve 250 is generally constant, as represented by segment 252, as material 106 approaches level 230. Between level 230 and level 240, ideal output curve 250 changes in a generally linear fashion with changes in top level 104 of material 106, as represented by segment 254. Above level 240, ideal output curve 250 again is a generally constant output, as represented by segment 256. In a similar fashion, an ideal output curve 258 for capacitive sensor 204 as a function of top level 104 of material 106 is shown. As shown, ideal output curve 258 is generally constant, as represented by segment 260, as material 106 approaches level 230. Between level 230 and level 232, ideal output curve 258 changes in a generally linear fashion with changes in top level 104 of material 106, as represented by segment 262. Above level 232, ideal output curve 258 again is a generally constant output, as represented by segment 264. Further, an ideal output curve 266 for capacitive sensor 208 as a function of top level 104 of material 106 is shown. As shown, ideal output curve 266 is generally constant, as represented by segment 268, as material 106 approaches level 234. Between level 234 and level 236, ideal output curve 266 changes in a generally linear fashion with changes in top level 104 of material 106, as represented by segment 270. Above level 236, ideal output curve 266 again is a generally constant output, as represented by segment 272. Lastly, an ideal output curve 274 for capacitive sensor 206 as a function of top level 104 of material 106 is shown. As shown, ideal output curve 274 is generally constant, as represented by segment 276, as material 106 approaches level 238. Between level 238 and level 240, ideal output curve 274 changes in a generally linear fashion with changes in top level 104 of material 106, as represented by segment 278. Above level 240, ideal output curve 274 again is a generally constant output, as represented by segment 280.

Although capacitive sensor 202 may alone serve as a capacitive sensor to monitor top level 104 of material 106 between level 230 and level 240, the additional sensors 204-208 may be selectively energized and have their output measured by controller 110. As shown in FIG. 7, for a sensor that is substantially horizontal, such as capacitive sensor 204, the output from this sensor is more a step response as compared to the output of a sensor that is substantially vertical, such as capacitive sensor 202.

In one embodiment, the output or characteristic monitored for each of sensors 202-208 is a voltage. In one embodiment, the output or characteristic monitored for each of sensors 202-208 is a current. In one embodiment, the output or characteristic monitored for each of sensors 202-208 is a frequency of the oscillator.

Figure 8:
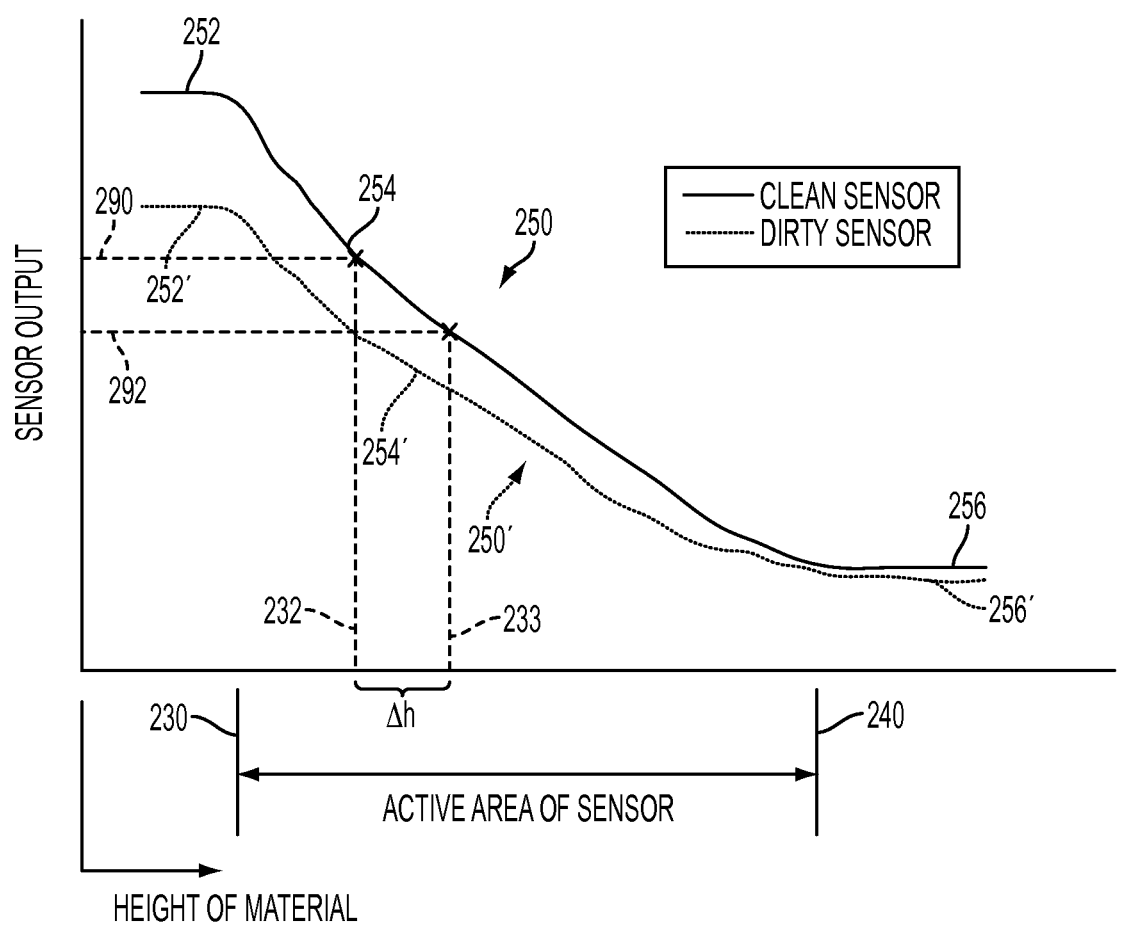
FIG. 8 illustrates an exemplary output for a first sensor of the sensor module of FIG. 5.
Figure 9:
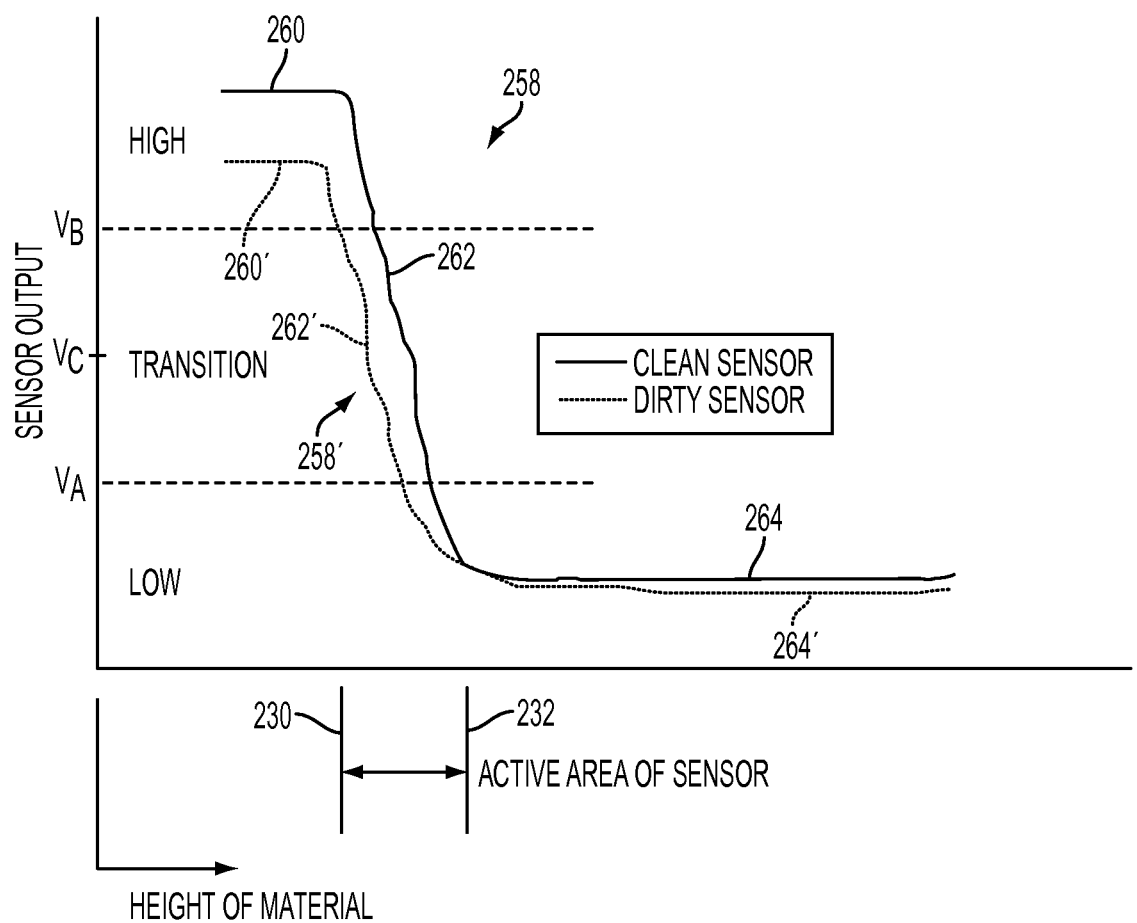
FIG. 9 illustrates an exemplary output for a second sensor of the sensor module of FIG. 5.

Referring to FIG. 8, another representation of ideal output curve 250 for capacitive sensor 202 is shown. FIG. 8 illustrates the difference between a generally ideal curve 250 for capacitive sensor 202 and a curve 250' corresponding to contaminant 142 build up on covering 130. As shown in FIG. 8, the output of capacitive sensor 202 is changed due to the presence of the contaminant buildup 142. Referring to FIG. 9, another representation of ideal output curve 258 for capacitive sensor 204 is shown. FIG. 9 illustrates the difference between a generally ideal curve 258 for capacitive sensor 204 and a curve 258' corresponding to contaminant 142 build up on covering 130. As shown in FIG. 9, the output of capacitive sensor 204 is also changed due to the presence of the contaminant buildup 142. The effect of contaminant 142 on the output of a sensor is dependent on many factors such as geometry of the sensor, sensing area, distance between the sensor active area and the sensed fluid, type of fluid, type of residues, and other factors. In one embodiment, the error shift on a substantially horizontal sensor (such as capacitive sensor 204) might be up to about 0.2 inches for water and the error shift on a substantially vertical sensor (such as capacitive sensor 202) might be more like about 1.5 inches for water.

Due to the relatively quick transition from segment 260 to segment 264 for capacitive sensor 204 the primarily horizontally arranged sensors, may be used to improve the signal to noise ratio of sensor module 200 and to make sensor module 200 far less sensitive to the build-up of contaminant 142 over time. A transition in output of sensor 204 may be used as a more accurate guide for the top level 104 of material 106 then capacitive sensor 202 alone. In this manner, capacitive sensor 204, capacitive sensor 206, and capacitive sensor 208 provide generally discrete or digital steps and capacitive sensor 202 provides a continuous analog feedback. The transitions of capacitive sensor 204 (as well as capacitive sensor 206 and capacitive sensor 208) may be used to calibrate capacitive sensor 202 so that capacitive sensor 202 may be used as a variable or analog output to show the top level 104 of material 106 over a large range of heights (from level 230 to level 240).

In one embodiment, the output of sensor 204 (as well as sensors 206 and 208) is monitored and classified as one of three separate states. The three states for capacitive sensor 204 are shown in FIG. 9. Controller 110 associates any voltage level at or above $V_B$ as the top level 104 of material 106 being at or below level 230 (state: HIGH), any voltage level above $V_A$ and below $V_B$ as the top level 104 of material 106 being between level 230 and level 232 (state: TRANSITION), and any voltage level less than $V_A$ as the top level 104 of material 106 being at or above level 232 (state: LOW). In one embodiment, the output of sensor 204 (as well as sensors 206 and 208) is monitored and classified as one of two separate states, LOW and HIGH. With reference to FIG. 9, the TRANSITION state is removed and controller 110 associates any voltage level at or above $V_C$ as the top level 104 of material 106 being at or below level 230 (state: HIGH), any voltage level at or less than $V_C$ as the top level 104 of material 106 being at or above level 232 (state: LOW). By monitoring when capacitive sensor 204 changes states controller 110 may recalibrate capacitive sensor 202. As such, a LOW state indicates the presence of material 106 and a HIGH state indicates the absence of material 106.

This is illustrated with reference to FIG. 8. As shown in FIG. 8, at a top level 104 of material 106 equal to level 232 capacitive sensor 202 should provide an output of 290. However, due to a buildup of contaminant 142 on covering 130, capacitive sensor 202 provides an output of 292 which on the ideal curve 250 would correspond to a top level 104 of material 106 equal to a level of 233. As such, if controller 110 was relying on ideal curve 250 it would record an error $\Delta h$ in top level 104 of material 106 if capacitive sensor 202 was used alone. This error would falsely provide a positive offset in the height meaning the controller 110 would consider the material 106 to be higher than it actually is. But, controller 110 may look at the output of capacitive sensor 204, which has a LOW state when the top level 104 of material 106 is at level 232. By identifying when capacitive sensor 204 transitions from the TRANSITION state to the LOW state (in the case of three states) or from (HIGH to LOW in the case of two states), controller 110 is able to include an offset (EH) to the value determined from the actual output of sensor 202 to better approximate the top level 104 of material 106. The sign of the offset ($\Delta H$) being determined based on the measured level of material 106 with sensor 202.

$$\text{LEVEL} = \text{MEASURED LEVEL} - \Delta H$$

When the sensor module 200 is first installed, the sensors 202-208 should respond generally in accordance with their respective ideal curves. Over time, as contaminant 142 builds up a shift will begin to creep into the measured values resulting in an offset being necessary. Over time the value of the offset increases as the thickness of contaminant 142 increases. When a voltage is being monitored the increase in the thickness of contaminant 142 results in a lower monitored voltage and thus a positive error in height (uncorrected measured level is higher than actual level). As such, over time the value of the offset at a given level generally increases. In one embodiment, the system may adjust for offsets until the corrections start to overlap the location of other sensors. For example, the offset from sensor 208 may result in the material height being lower than or at the location of sensor 204, but based on the output of sensor 204 it is known that the material is at or above sensor 204. In one embodiment, the system may continue to operate as long as the system is able to detect the state changes at sensor 204 and sensor 206 and as long as the corrected height is within the active range of sensor 202.

In one embodiment, the output of sensors 204, 206, and 208 have a hysteresis which results in different threshold values depending on which direction the output signal is moving (signal descending or signal ascending). For the examples provided herein, hysteresis is not accounted for.

Figure 10:
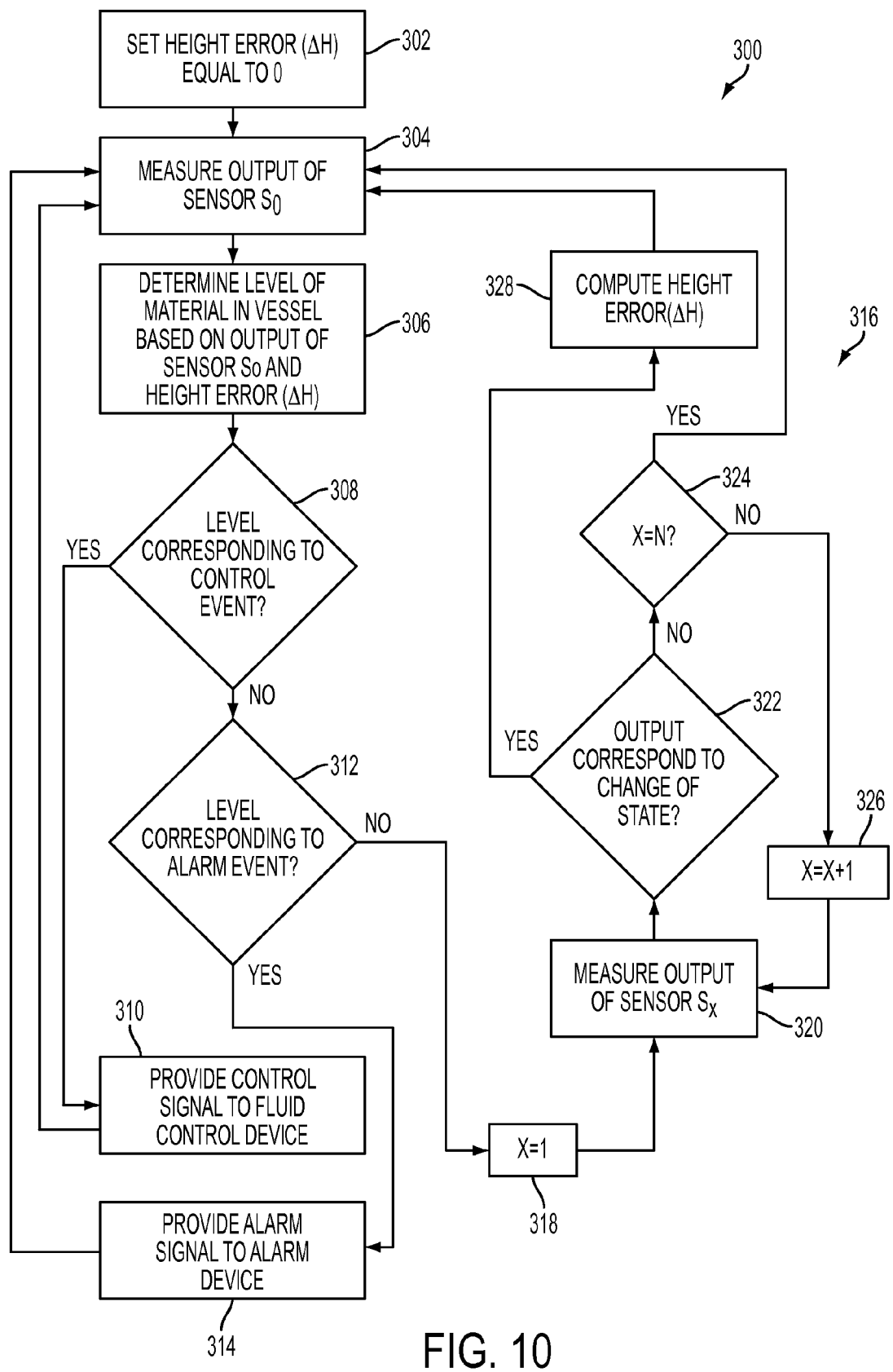
FIG. 10 illustrates an exemplary processing sequence of the controller associated with the sensor module.

Referring to FIG. 10, a first exemplary processing sequence 300 for controller 110 is shown. In one embodiment, processing sequence 300 is software stored in a memory 111 accessible by controller 110. Processing sequence 300 sets an initial offset value ($\Delta H$) equal to zero, as represented by block 302. In one embodiment, the initial offset value ($\Delta H$) is set equal to a value stored in memory 111, such as the last determined offset value. Controller 110 then measures the output of sensor 202, as represented by block 304. Controller 110 based on the measured output of sensor 202 determines a level of material 106 in vessel 108 based on the measured output of capacitive sensor 202 and the value of the height error ($\Delta H$), as represented by block 306. In one embodiment, controller 110 has a lookup table with output values for capacitive sensor 202 which correspond to levels of material 106 based on curve 250. In one example, controller 110 takes the computed level from the lookup table based on the measured output from capacitive sensor 202 and adds the height error thereto to determine the level for material 106 in vessel 108.

Controller 110 compares the determined level to various control events stored in memory 111, as represented by block 308. An exemplary control event is powering on the pump when fluid control device 120 is a pump. Another exemplary control event is shutting off the pump when fluid control device 120 is a pump. For these two examples, controller 110 provides a control signal to fluid control device 120, as represented by block 310. If the determined level does not correspond to a control event, controller 110 compares the determined level to various alarm events stored in memory 111, as represented by block 312. An exemplary alarm event is the sounding of an audio alarm when top level 104 of material 106 exceeds a threshold level. For this example, controller 110 provides a control signal to an alarm device 113. Exemplary alarm devices include audio alarm devices, such as speakers, horns, and other suitable audio devices; visual alarm devices, such as lights, displays, and other suitable visual devices; and tactile alarm devices, such as vibration devices and other suitable tactile devices.

If the determined level does not correspond to an alarm event, in one embodiment controller 110 cycles through the remaining sensors 204, 206, and 208 to determine if an updated height error ($\Delta H$) is needed, as generally represented by portion 316 of processing sequence 300. Controller 110 cycles through each of the remaining sensors 204, 206, and 208 to see if any has an output which corresponds to a change of state. Controller compares the current state to the last state stored in memory 111.

Figure 14:
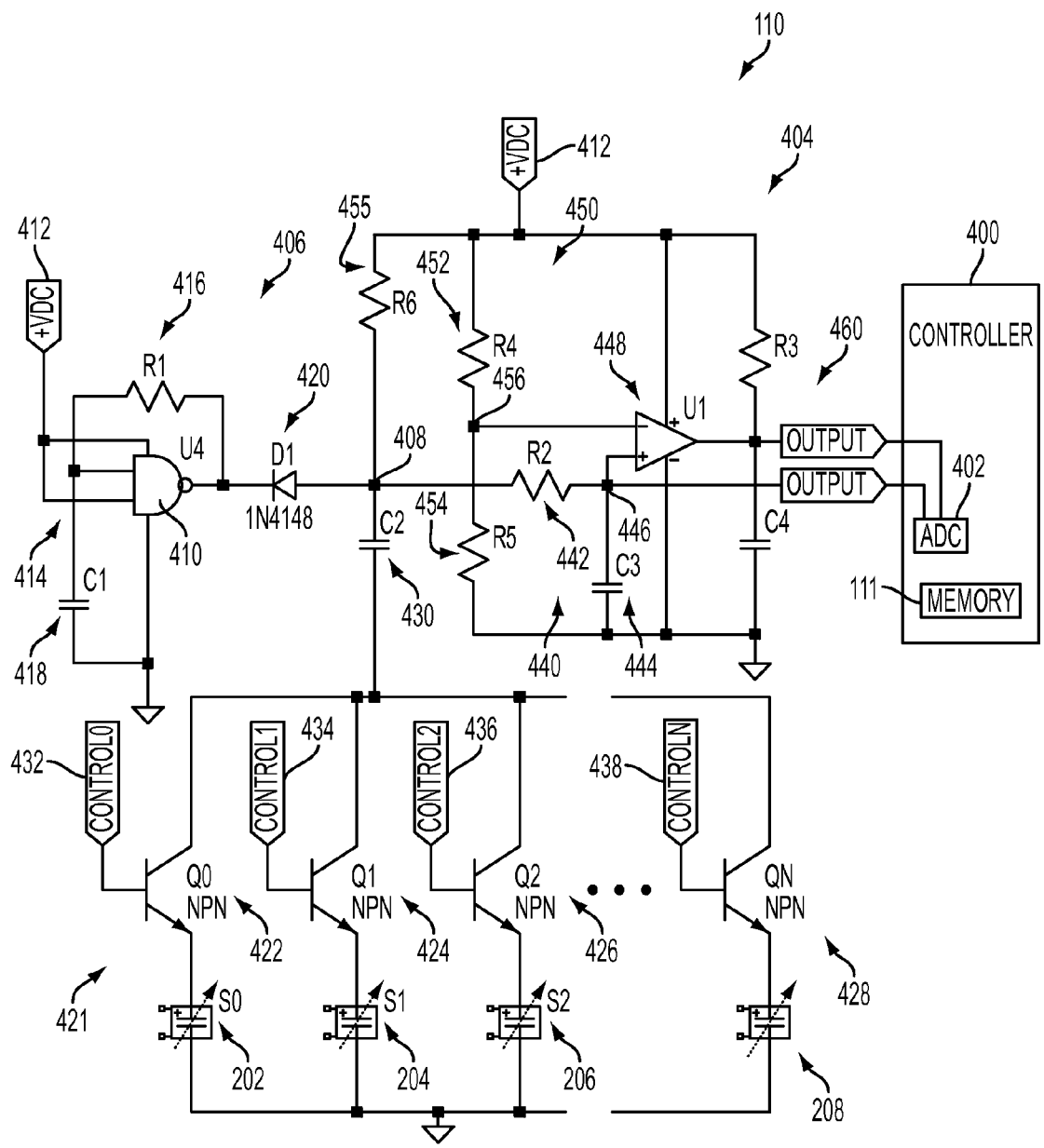
FIG. 14 illustrates an exemplary controller associated with the sensor module of any of the Figures.
Figure 15:
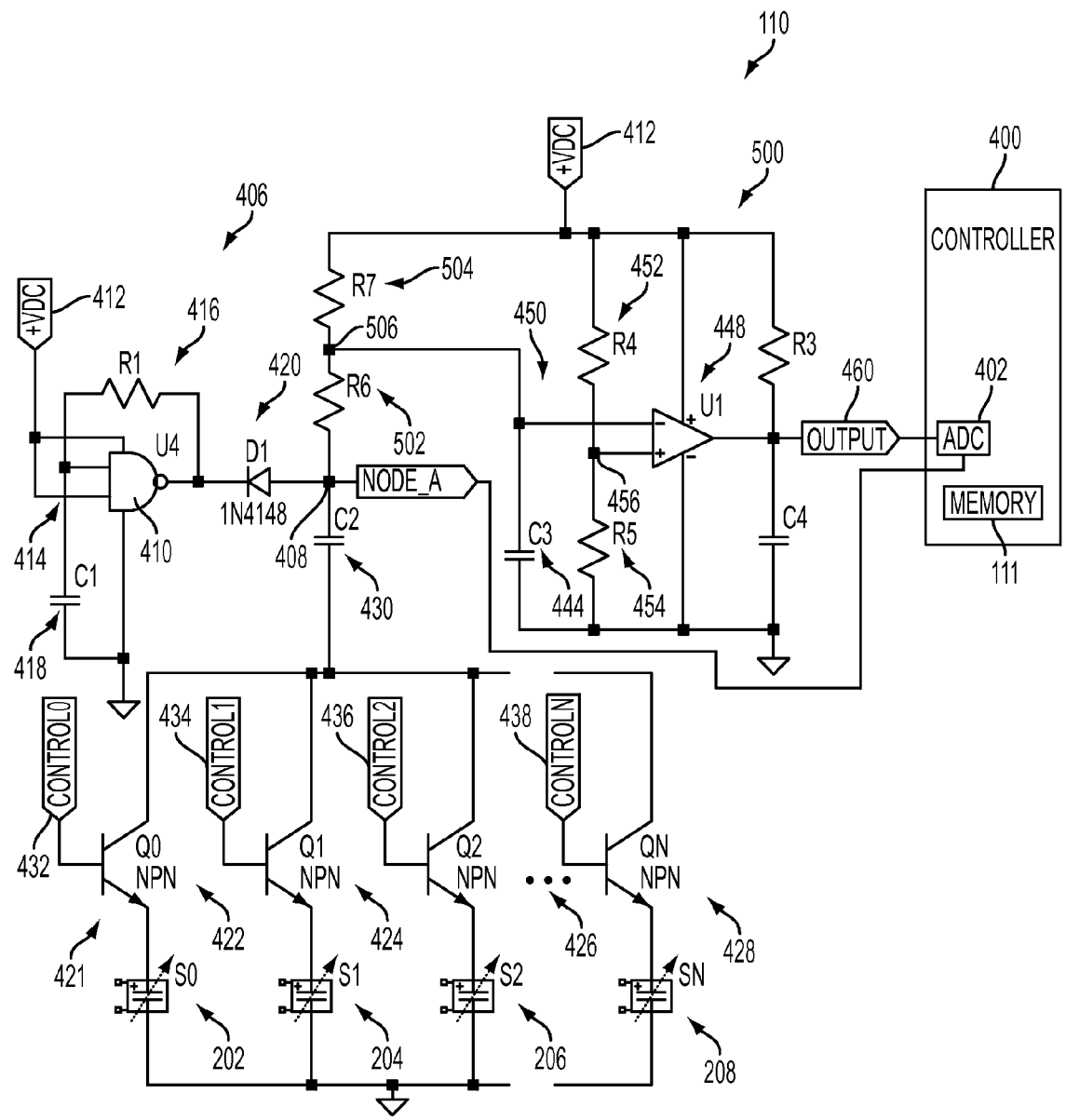
FIG. 15 illustrates an exemplary controller associated with the sensor module of any of the Figures.

As shown in FIGS. 14 and 15 and explained herein, circuitry is provided which provides a measured output of a sensor as a digital indication of the state of the sensor based on the output of an operational amplifier 448. In one embodiment, controller 110 simply monitors a voltage or other output associated with the sensor and compares that measured value to a threshold value to decide the state of the sensor.

Returning to FIG. 10, the first sensor is capacitive sensor 204, as represented by block 318. Controller 110 measures the output from capacitive sensor 204, as represented by block 320, and determines the state of sensor 204, as represented by block 322. If the state of sensor 204 has not changed, controller 110 checks the next sensor until all sensors have been checked, as represented by blocks 324 and 326, or until a sensor output corresponds to a change in state, as represented by block 322.

If the measured output for a given sensor corresponds to a threshold value, controller 110 determines an updated height error (ΔH), as represented by block 328. This updated height error (ΔH) is used by controller 110 to calibrate the next measurement of capacitive sensor 202, as represented by blocks 304 and 306.

Figure 11:
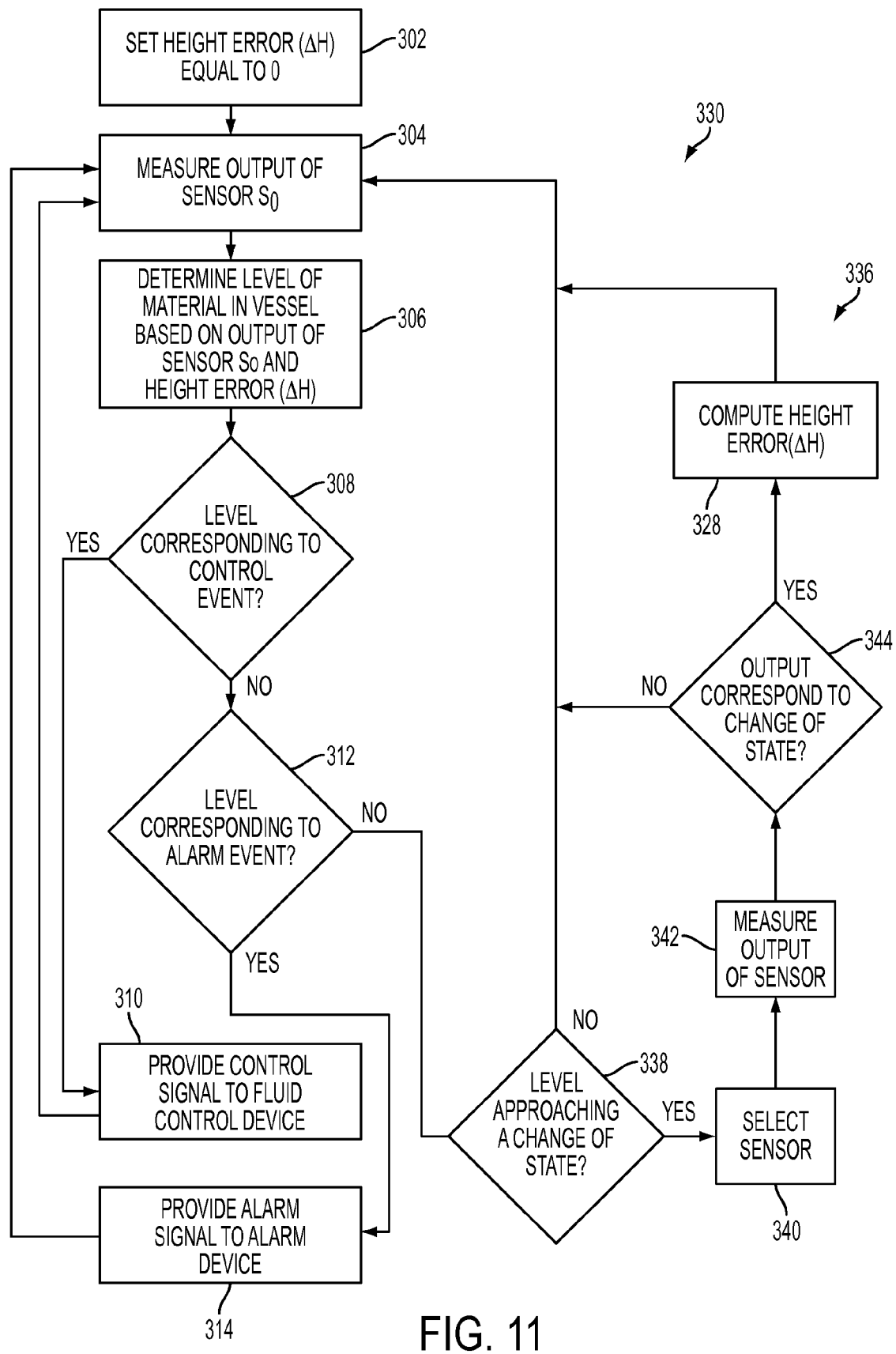
FIG. 11 illustrates another exemplary processing sequence of the controller associated with the sensor module.

Referring to FIG. 11, in one embodiment, if the determined level for capacitive sensor 202 does not correspond to an alarm event, controller 110 based on the determined level from sensor 202 checks less than all of the remaining sensors 204-208 to determine if an updated height error (ΔH) is needed, as generally represented by portion 336 of processing sequence 330.

Controller 110 based on historical determined levels of material 106 may determine the direction (rising or falling) of level 104. Controller then determines if the last determined level is approaching a state change of any of the remaining sensors 204-208, as represented by block 338. In one embodiment, approaching a state change means that the last determined level is within 0.2 inches of when the respective sensor of the remaining sensors 204-208 changes state. If not, controller 110 returns to block 304. If so, controller 110 selects the sensor, as represented by block 340, and measures the output of the selected sensor, as represented by block 342. Controller 110 checks to see if the measured output corresponds to a state change, as represented by block 344. If not, controller 110 returns to block 304. If so, controller 110 determines an updated height error (ΔH), as represented by block 328. This updated height error (ΔH) is used by controller 110 to calibrate the next measurement of capacitive sensor 202, as represented by blocks 304 and 306.

Referring to Tables I-IV below, a representation of the data stored in memory 111 is shown. Table I represents the data stored in relation to sensor 202. The data includes the sensor ID, the current measured output value; the current height error value (ΔH); the current determined level based which is the sum of the current measured output value and the current height error (ΔH); and historical level data. The historical level data provides an indication of the current direction of level 104 and may be used to determine flow rate (assuming the data is time stamped) and other parameters. With historical data related to capacitive sensor 202, controller 110 may track patterns of top level 104 of material 106 as a function of time of day. One exemplary pattern would be fluid filling patterns. Another exemplary pattern would be fluid draining patterns.

TABLE I

| SENSOR | MEASURED OUTPUT | (ΔH) | DETERMINED LEVEL | HISTORICAL LEVEL DATA |
|---|---|---|---|---|
| 202 | {VALUE} | {VALUE} | {VALUE} | {VALUE}; {VALUE}; {VALUE}; . . . |

Table II represents the data stored in relation to sensors 204-208. The data includes the sensor ID, the last state of the sensor, and the reference voltage (VC in the case of a two state system). Controller 110 based on the last state value can determine if a current determined state represents a change in state.

TABLE II

| SENSOR | LAST STATE | REFERENCE VOLTAGE ($V_C$) |
|---|---|---|
| 204 | HIGH | {VALUE} |
| 206 | LOW | {VALUE} |
| 208 | LOW | {VALUE} |

Table III represents the data stored in relation to control events for control system 100. The data includes a control event ID, the level corresponding to the control event; and the action to be taken by controller 110.

TABLE III

| CONTROL EVENT | LEVEL | ACTION |
|---|---|---|
| 1 | $L_2$ | TURN PUMP OFF |
| 2 | $L_5$ | TURN PUMP ON |
| 3 | $L_3$ | {VALUE} |

Table IV represents the data stored in relation to alarm events for control system 100. The data includes an alarm event ID, the level corresponding to the alarm event; and the type of alarm. As shown in Table IV, the type of alarm may be dependent on more than the level 104. Based on the alarm event, controller 110 may provide an alarm signal to the appropriate alarm device.

TABLE IV

| ALARM EVENT | LEVEL | ALARM TYPE |
|---|---|---|
| 1 | $L_6$ | IF PUMP ON; LEVEL RISING TOO FAST |
| 2 | $L_6$ | IF PUMP OFF; PUMP MALFUNCTION |
| 3 | $L_1$ | {VALUE} |

In one embodiment, control system 100 also includes at least one user input 115 (see FIG. 5). With sensor module 200 monitoring top level 104 of material 106 over a large range with a passive sensor, various dynamic setpoints for either control events or alarm events may be established. These dynamic setpoints may be set through user input 115. An exemplary user input 115 is a knob which changes a value of a variable resistive element. Another exemplary user input 115 is one or more buttons, dials, or other inputs which provide a digital setpoint value to controller 110. In the case of multiple setpoints, a lookup table of setpoints may be stored in memory 111, such as shown in Tables III and IV for control events and alarm events, respectively.

This arrangement permits an operator to turn a knob and be able to adjust the pump on or off level as needed for a given application. For example, if control system 100 was designed for a maximum distance from pump on to pump off of twelve inches, this range may be adjusted down for applications where space is constrained and a twelve inch differential would cause overflowing of the vessel while still maximizing the range to minimize the number of power cycles to the pump and prolong life of a pump.

In one embodiment, controller 110 monitors the top level 104 of material 106 while in a power save or sleep mode and then wakes-up the power circuit for pump or fluid control device 120 when the top level 104 nears a setpoint that requires action by the pump or fluid control device 120. This results in reduced power consumption. This system may be used with a portable power supply or a conventional plug-in power supply to save on energy consumption.

In some applications, such as rainwater evacuation, the flow rate of fluid from fluid supply 101 into vessel 108 may exceed the flow rate of fluid leaving vessel 108 through fluid control device 120. As such, the fluid level 104 in vessel 108 continues to rise, even though fluid control device 120 has been activated. This continued rise may be monitored and used as an alarm event to notify someone prior to overflowing. This is indicated as alarm event 1 in Table IV.

In another case the top level 104 of material 106 may be lowering, but at a slower rate which will result in fluid control device 120 staying on longer than it is rated for. This would be an alarm event to notify someone that the fluid control device 120 is in danger of overheating and shutting down.

In another case, the evacuation rate is tracked and used to identify a clogged fluid conduit 122 or otherwise faulty fluid control device 120. In this case, an alarm event is triggered to notify someone of the potential clog or maintenance problem.

In one embodiment, controller 110 is programmed to keep top level 104 at a constant level. In one embodiment, controller 110, is programmed to reduce the top level 104 of material 106 in vessel 108 if the top level 104 reaches an upper threshold. In one example, controller 110 reduces the top level 104 until a lower threshold is reached. In one embodiment, controller 110, is programmed to raise the top level 104 of material 106 in vessel 108 if the top level 104 is at a lower threshold. In one example, controller 110 raises the top level 104 until an upper threshold is reached by controlling a fluid control device 120 associated with fluid supply 101.

Figure 12:
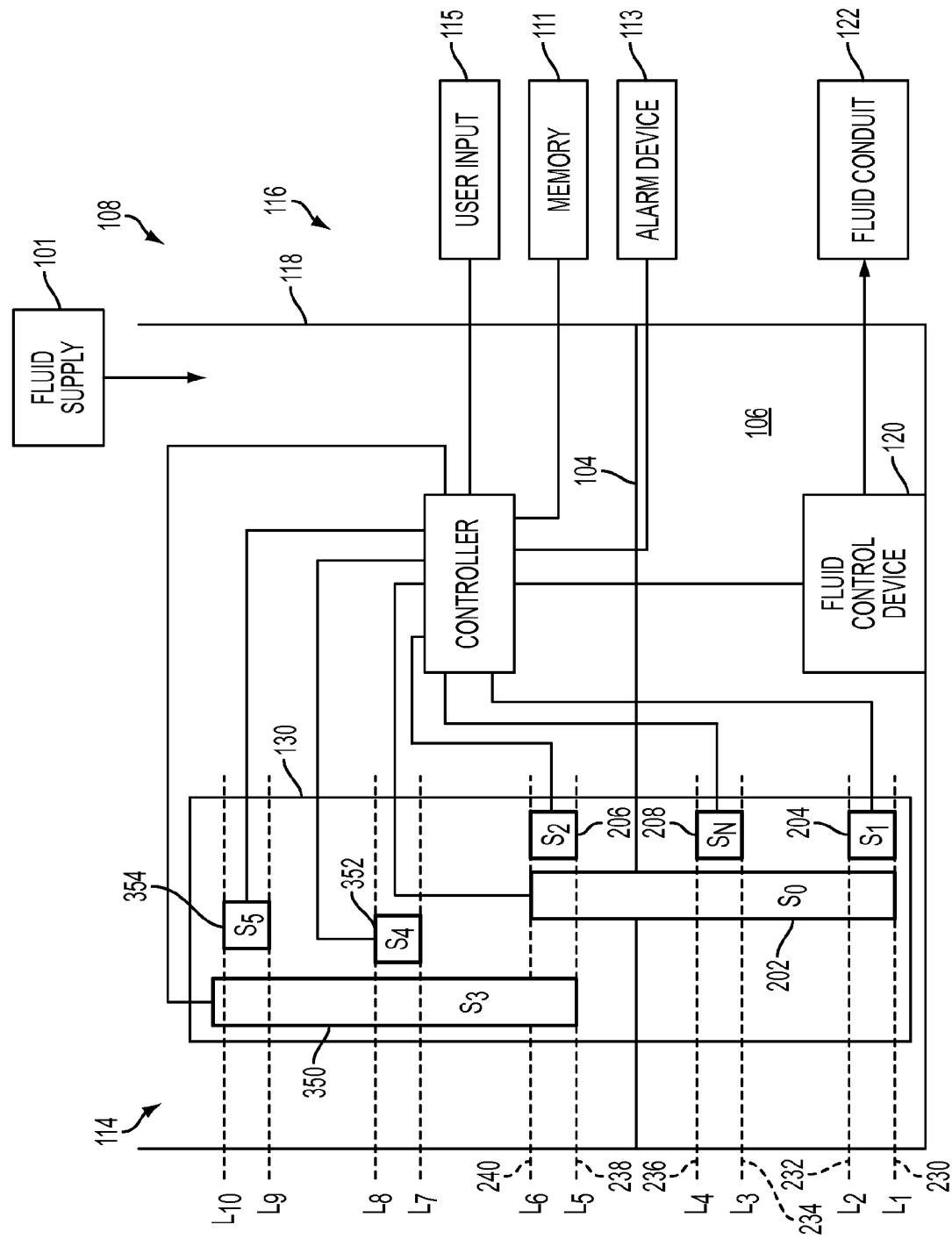
FIG. 12 illustrates another exemplary sensor module having a plurality of sensors positioned proximate to a material in a vessel, a controller coupled to the sensor module, and a fluid control device coupled to the controller.

Referring to FIG. 12, in one embodiment sensor module 200 includes multiple vertical sensors 202 and 350. This increases the overall range of sensor module 200. In the illustrated embodiment, capacitive sensor 202 and capacitive sensor 350 overlap at least a portion of their monitoring regions. In one embodiment, capacitive sensor 202 and capacitive sensor 350 do not overlap. Two additional horizontal sensors 352 and 354 are also included.

Figure 13:
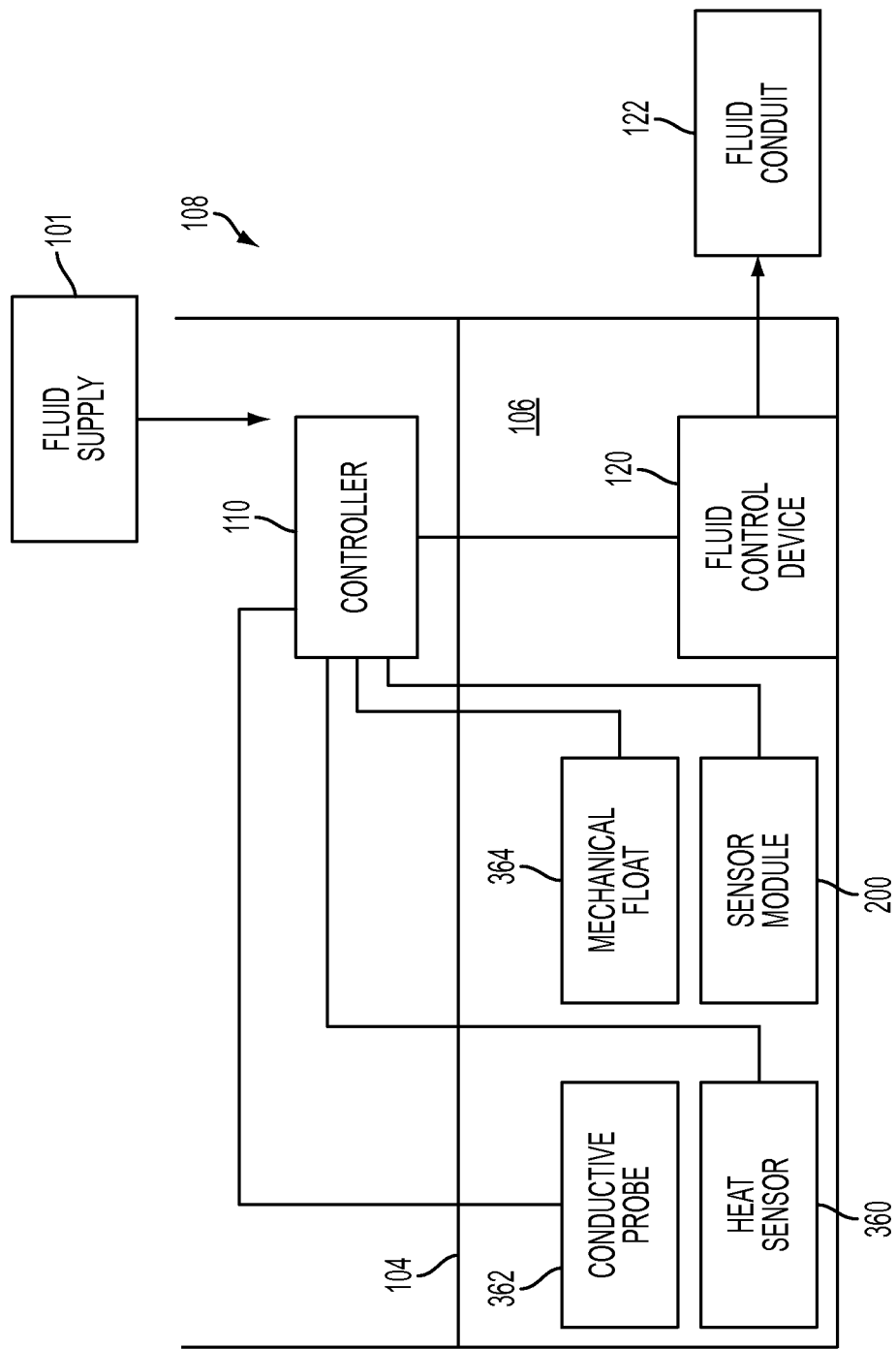
FIG. 13 illustrates yet another exemplary sensor module having a plurality of sensors positioned proximate to a material in a vessel, a controller coupled to the sensor module, and a fluid control device coupled to the controller.

Referring to FIG. 13, in one embodiment, control system 100 includes additional types of sensors in addition to sensors 200-208 or in place of at least one of sensors 204-208. In one example, a heat sensor 360, such as a heater element with an embedded thermistor may be placed at a level that a transition is to be monitored. When no material 106 is present at that level, a given amount of current would produce a particular temperature at the thermistor. When material 106 is present at that level, the temperature of heat sensor 360 steps to a totally different value. Certain types of material will cause the temperature to increase while other types of materials will cause the temperature to decrease.

In one embodiment, the heat sensor 360 would only need to be used occasionally. It would be turned on when controller 110 determines that the material 106 is approaching the level of the sensor. This would prolong the life of heat sensor 360. Heat sensor 360 may be used to calibrate capacitive sensor 202. In one embodiment, the heating element and thermistor are potted or encapsulated to a metal plate such as stainless steel so that the metal is in direct contact with the material 106 to be measured but the electronics are protected from the material 106.

In another example, a pair of conductive probes 362 are placed at a level of material 106 to be monitored. When no material 106 is present at the level to be monitored, a conductive path is not present between the conductive probes. When material 106 is present at the level to be monitored, the material 106 provides a conductive path between the probes.

In one embodiment, the conductive probes 362 would only need to be used occasionally. They may be energized when controller 110 determines that the material 106 is approaching the level being monitored by conductive probes 362. Conductive probes 362 may be used to calibrate capacitive sensor 202.

In yet another example, a mechanical float 364, is placed at a level of material 106 to be monitored. When no material 106 is present at the level to be monitored, a float member of mechanical float is in a lower position which results in an associated electrical circuit being in either an open or closed state. As the level of material 106 rises the position of the float member also rises. When material 106 is present at the level to be monitored, the material 106 raises the float member to position wherein the associated electrical circuit is in the other of an open or closed state. Mechanical float 364 may be used to calibrate capacitive sensor 202.

Referring to FIG. 14, an exemplary embodiment of controller 110 is shown. Controller 110 includes a microprocessor 400 having an associated memory 111 and an analog-to-digital converter 402. An exemplary microprocessor is Model No. ATTINY 13-20PU available from Atmel Corporation. Another exemplary microprocessor is Model No. PIC12F629T-I/SN available from Microchip Technology. Another exemplary microprocessor is Model No. MC9S08QG4CPAE available from Freescale Semiconductor. Controller 110 also includes a circuit 404. Circuit 404 includes a pulse generator circuit 406 which produces a generally square wave output at node 408. Pulse generator circuit 406 includes a NAND gate 410 having a constant voltage supply 412 as a first input and an oscillator 414 as a second input. Oscillator 414 includes resistor 416 and capacitor 418. Diode 420 serves to separate node 408 from oscillator 414 when the output of NAND gate 410 goes low.

In one embodiment, pulse generator circuit 406 generates a square wave pulse with a frequency in the range of about 20 kHz to about 300 kHz. In one embodiment, pulse generator circuit 406 generates a square wave pulse with a frequency up to about 30 kHz. In one embodiment, pulse generator circuit 406 generates a square wave pulse with a frequency of about 30 kHz. In one embodiment, pulse generator circuit 406 generates a square wave pulse with a frequency of about 26 kHz. In one embodiment, pulse generator circuit 406 generates a square wave pulse with a frequency in the range of about 20 kHz to about 30 kHz.

A sensor selection circuit 421 is also shown. Each of sensors 202-208 have a first element or electrode coupled to the emitter of a respective transistor 422-428 and a second element or electrode coupled to ground. The collector of each of transistors 422-428 are coupled to a capacitor 430 which is in turn coupled to node 408. A respective sensor 202-208 may be placed in series with capacitor 430 by turning on the respective transistor 422-428. The respective transistor is turned on by applying a small current through the respective one of control inputs 432-438. Each of control inputs 432-438 are coupled to microprocessor 400. As such, microprocessor 400 may selectively control which individual sensor or combination of sensors are in series with capacitor 430 via control inputs 432-438.

The voltage at node 408 is integrated over time with an integrator circuit 440. Integrator circuit 440 includes resistor 442 and capacitor 444. The output of integrator circuit 440 is provided at node 446 which is coupled to a non-inverting input of an operational amplifier 448. The inverting input of operational amplifier 448 is coupled to a node 456 of a voltage divider circuit 450. Voltage divider 450 includes resistor 452 and resistor 454.

In operation, an output 460 of operational amplifier 448 is low until the voltage at node 446 exceeds the constant input voltage provided by voltage divider circuit 450 at node 456. At that point, the output 460 of operational amplifier 448 goes high. Output 460 works well to detect when the output of a given sensor has crossed a threshold value, such as one of voltage $V_A$, $V_B$, and $V_C$ in FIG. 9. As such, output 460 provides an input for microprocessor 400 to determine when one of sensors 204-208 changes states.

As each of sensors 204-208 may have different setpoints or multiple setpoints (such as $V_A$ and $V_B$), in one embodiment, one or both of resistor 452 and resistor 454 are replaced with a plurality of resistors in parallel which are selectively placed in the circuit 450 as resistor 452 through transistor switches, in the same manner as described in relation to sensors 202-208. This provides a mechanism whereby microprocessor 400 is able to select the appropriate threshold voltage based on the state change to be monitored. For example, with reference to FIG. 9, a first R4 may be used to establish the threshold voltage at node 456 to be $V_A$ and a second R4 may be used to establish the threshold voltage at node 456 to be $V_B$. In a similar fashion, in one embodiment, the charging resistor 455 may be replaced with a plurality of resistors in parallel which are selectively placed in the circuit by microprocessor 400 as resistor 455 through transistor switches, in the same manner as described in relation to sensors 202-208. This provides a mechanism for changing the charging time for the sensors 202-208.

Figure 23:
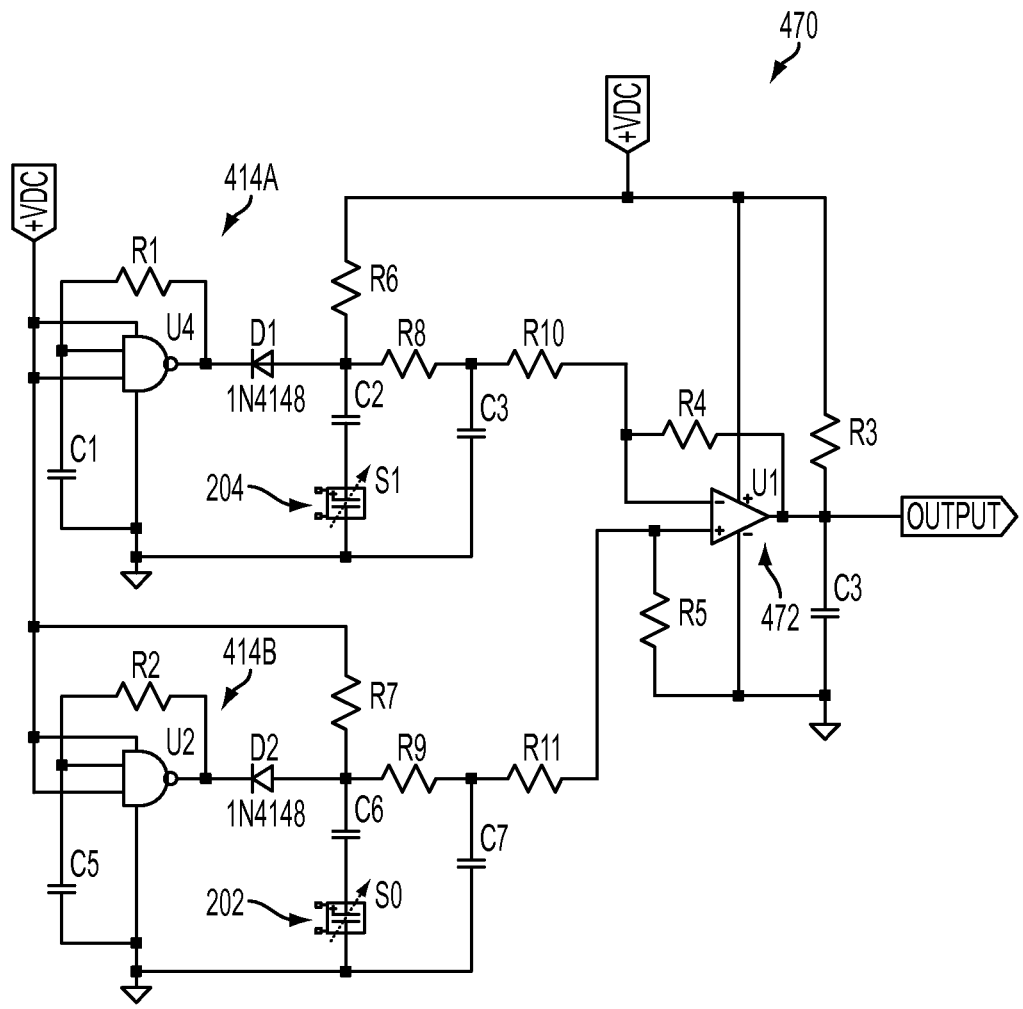
FIG. 23 illustrates an exemplary controller associated with the sensor module of any of the Figures.

With regard to capacitive sensor 202, microprocessor 400 is not interested in a threshold setpoint, rather just the output of capacitive sensor 202. As such, microprocessor 400 also has a connection to node 446 to monitor the output voltage when transistor 422 is turned on. In one embodiment, shown in FIG. 23, the output of sensor 202 may be adjusted based on one of the horizontal sensors, sensor 204 shown, with an analog circuit 470 instead of controller 400. Operational amplifier 472 in circuit 470 functions to calibrate the vertical sensor 202 by subtracting out the voltage from the lowest horizontal sensor 204. In the case of circuit 470, the capacitance of sensor 204 should closely match the capacitance of the corresponding portion of sensor 202.

In one embodiment, the values of the components shown in FIG. 14 are the values provided in Table V below.

TABLE V

| Identifier | Description | Value |
|---|---|---|
| R6 | Charging Resistor | 110K ohm |
| C2 | Inline Capacitor | 1 nF |
| R1 | NAND gate Oscillator control | 75K ohm |
| C1 | NAND gate Oscillator control | 560 pF |
| R2 | Integrator | 10K ohm |
| C3 | Integrator | 0.22 uF |
| R3 | Pull up Resistor | 33K ohm |
| C4 | | 0.22 uF |
| R4 | Voltage Divider | 10K ohm |
| R5 | Voltage Divider | 10K ohm |

In one embodiment, the capacitance of sensors 202-208 are in the range of 8 pF to 300 pF.

Although described as monitoring the output of each of capacitive sensors 202-208 separately, in one embodiment, controller 110 may monitor each of capacitive sensors 202-208 at the same time in series. In one example a separate circuit 404 and pulse generator circuit 406 are provided for each of capacitive sensors 202-208 and controller 110 monitors the output 460 for each in series. In another example, multiple sensors of capacitive sensor 202-208 may be turned on with the arrangement shown in FIG. 14. As such, the turned on sensors are placed in parallel and a combined capacitance is measured at at least one of node 446 and output 460.

In one embodiment, controller 110 includes a processing sequence to monitor one or more of capacitive sensor 202-208 as vessel 108 is filling or draining at a constant rate. The change of the capacitance of capacitive sensor 202-208 should be generally linear for levels within their monitoring ranges. As such, based on the elapsed time and a knowledge of the geometry of vessel 108, controller 110 can determine an expected top level 104 of material 106 and compare that to a measured top level 104 to adjust out changes in the respective sensors 202-208, such as drift. This also allows for both warning of a maintenance need or for activating an alarm if one or multiple sensors stop functioning, while allowing the system to operate on the remaining sensors.

In one embodiment, controller 110 monitors a current associated with one or more of the respective capacitive sensors 202-208 instead of a voltage. Referring to FIG. 15, a circuit 500 is coupled to microprocessor 400. Circuit 500 includes a pulse generator circuit 406 and a sensor selection circuit 421. Circuit 500 also includes voltage divider circuit 450 which provides a reference voltage at node 456. The reference voltage is the non-inverting input to operational amplifier 448. The inverting input to operational amplifier 448 is the voltage at node 506 which is between resistor 502 and resistor 504.

Resistor 504 is a current sense resistor. With the arrangement shown in FIG. 15, when the sense resistor 504 has little to no current flowing through it, the voltage across sense resistor 504 is small and the resulting voltage at node 506 is very close to the supply voltage 412. This is above the voltage of node 456 and hence the output of operational amplifier 448 is low. As the current through resistor 504 increases the voltage at node 506 drops. This drop, if continued, eventually falls below the reference voltage at node 456 resulting in the output from operational amplifier 448 going high. As the effective capacitance of the sensor increases due to a material covering more and more of the sensors capacitive elements more AC current can then flow through the sensor to ground.

This results in a drop in the voltage at node 408 and also an increase in current that is supplied through the current sense resistor 504.

In one embodiment, the values of the components shown in FIG. 15 are the values provided in Table VI below.

TABLE VI

| Identifier | Description | Value |
| --- | --- | --- |
| R6 | Charging Resistor | 105K ohm |
| C2 | Inline Capacitor | 1 nF |
| R1 | NAND gate Oscillator control | 75K ohm |
| C1 | NAND gate Oscillator control | 560 pF |
| R7 | Current Sense Resistor | 3K ohm |
| C3 | Integrator | 0.67 uF |
| R3 | Pull up Resistor | 33K ohm |
| C4 |  | 0.22 uF |
| R4 | Voltage Divider | 2K ohm |
| R5 | Voltage Divider | 200K ohm |

Based on the values in the above table, the reference voltage at node 456 is about 11.88 VDC (assuming constant voltage supply 412 is about 12 VDC). Since the voltage from the reference is less than the voltage from the sense resistor 504 when the current through resistor 504 is small the output 460 of operational amplifier 448 is low. When enough current (about 40 microamps) flows through the sense resistor 504, the voltage at node 506 drops to below the 11.88V reference at node 456 and the output 460 of operational amplifier 448 goes high.

Figure 22:
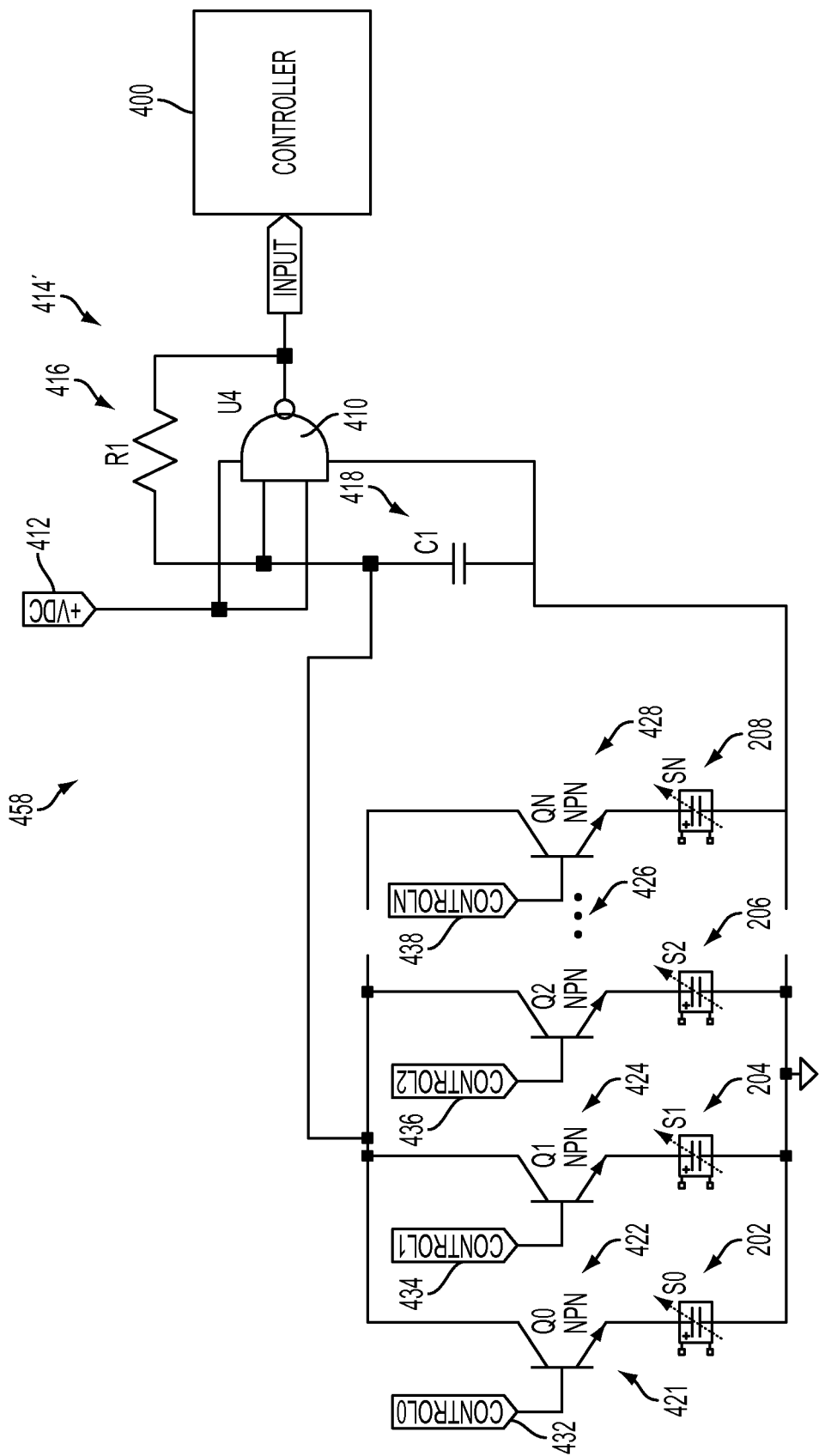
FIG. 22 illustrates an exemplary controller associated with the sensor module of any of the Figures.

In one embodiment, controller 110 monitors a frequency of the oscillator based on one or more of the respective capacitive sensors 202-208 instead of a voltage. As the level of material 106 rises and affects more and more of the surface area of a given sensor, the effective capacitance of that sensor changes. This change in capacitance affects the oscillation frequency of the oscillator 414. The basic function of oscillator 414 is controlled by resistor 416 and capacitor 418 such that depending on how fast capacitor 418 charges the frequency of oscillation can go up or down. The amount of feedback current through resistor 416 is also affected by node 408 and the capacitance of the sensor or sensors which are currently part of the circuit. By counting the oscillations or pulses of oscillator 414, controller 110 may detect a change in the capacitance of the sensor or sensors which are currently part of the circuit. Referring to FIG. 22, an exemplary analog circuit 458 is shown connected to controller 400. Circuit 458 is comprised of a modified oscillator 414' which includes sensor selection circuit 421 to selectively place one or more of sensors 202-208 in parallel with capacitor 418. Controller 400 counts the pulses from oscillator 414' to provide an indication of the effective capacitance of whichever sensors 202-208 that are selected with sensor selection circuit 421.

Figure 16:
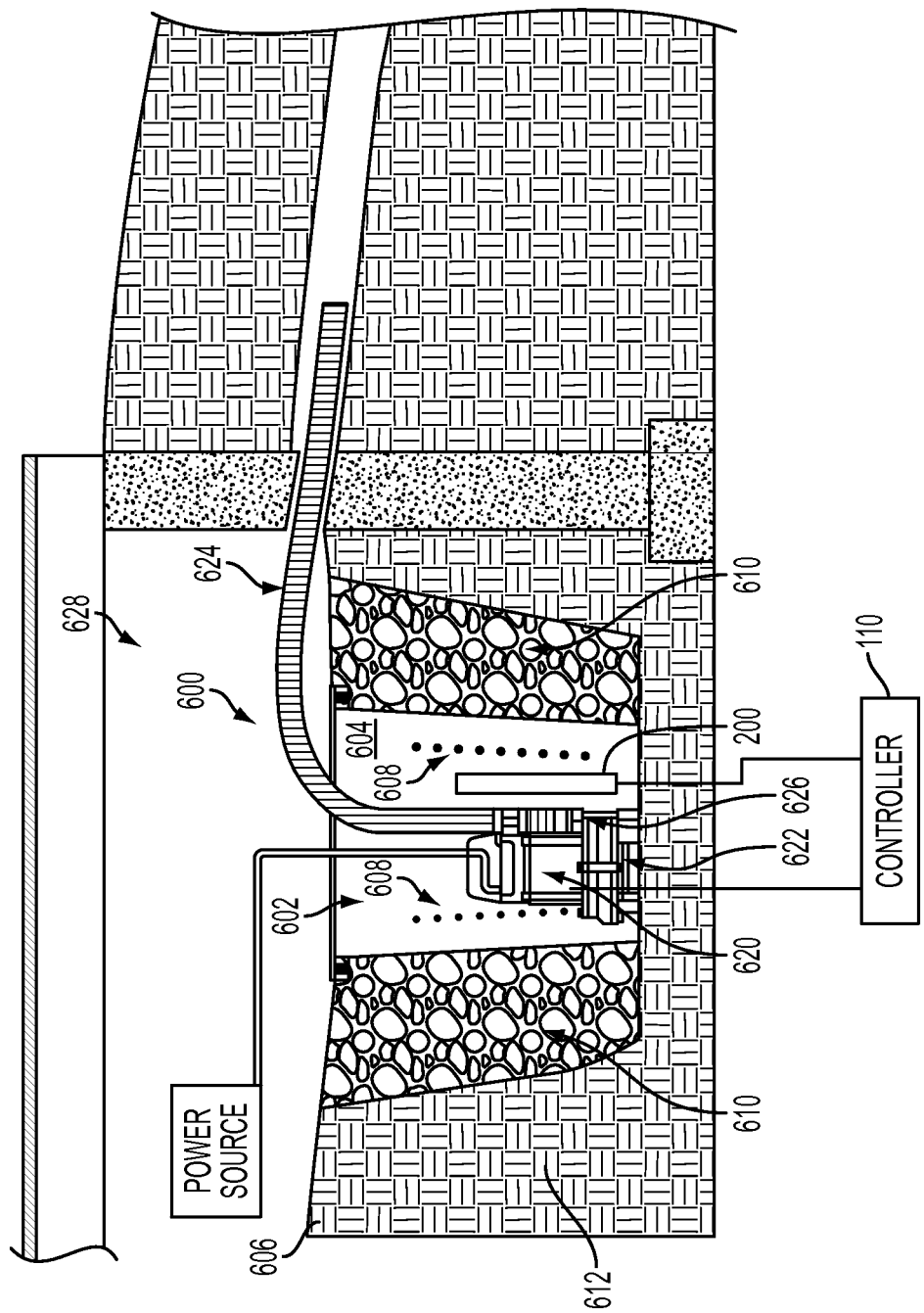
FIG. 16 illustrates a sump system including a sensor module.

Referring to FIG. 16, an exemplary sump system 600 is shown. Sump system 600 includes a basin 602 which is placed below ground level 606. Basin 602 is generally surrounded by an aggregate 610 which facilitates the flow of water from the surrounding soil 612 into basin 602 through opening 608 in the wall 604 of basin 602. Sensor module 200 is shown coupled to an interior of wall 604. In one embodiment, sensor module 200 is coupled to an exterior of wall 604. In one embodiment, sensor module 200 is coupled to a support (not shown).

Sump system 600 includes a pump 620 which displaces water from the interior of basin 602 and communicates the water to a discharge fluid conduit 624. Fluid enters the pump 620 from a lower surface 622 of pump 620. A check valve 626 is placed between pump 620 and discharge fluid conduit 624 to prevent backflow of water from discharge fluid conduit 624 into basin 602. The operation of pump 620 is controlled by controller 110 through the measurements of one or more sensors of sensor module 200. Sump system 600 assists in the removal of moisture from a crawl space area 628.

Figure 17:
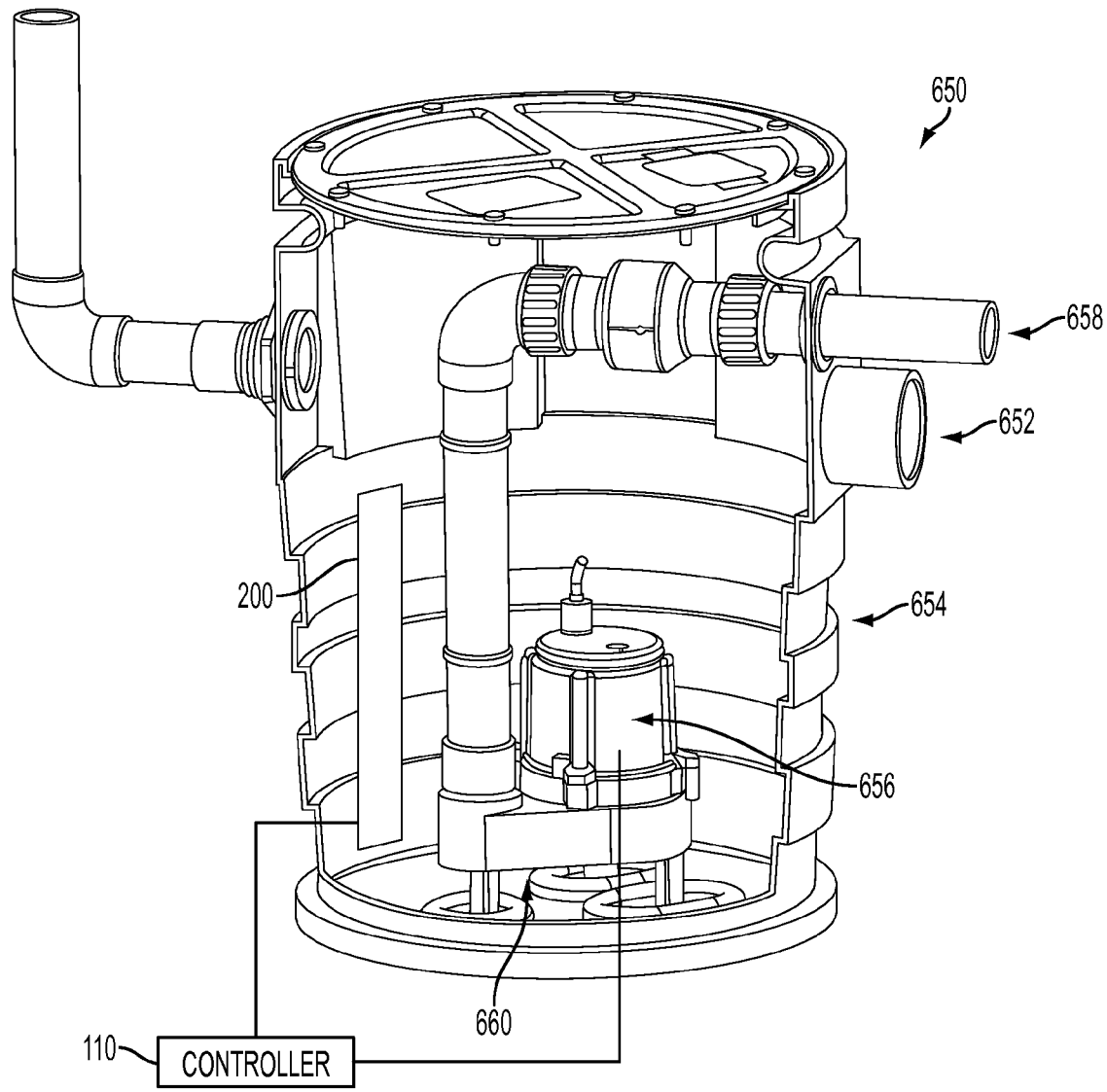
FIG. 17 illustrates a wastewater system including a sensor module.

Referring to FIG. 17, an exemplary wastewater system 650 is shown. Wastewater system 650 receives wastewater through an input fluid conduit 652 into a vessel 654. Controller 110 monitors the level of wastewater in vessel 654 with sensor module 200 and activates a pump 656 to displace the wastewater through an output fluid conduit 658. The wastewater enters pump 656 through a bottom 660 of pump 656. Sensor module 200 is shown coupled to an interior of vessel 654. In one embodiment, sensor module 200 is coupled to an exterior of vessel 654. In one embodiment, sensor module 200 is coupled to a support (not shown).

Figure 18:
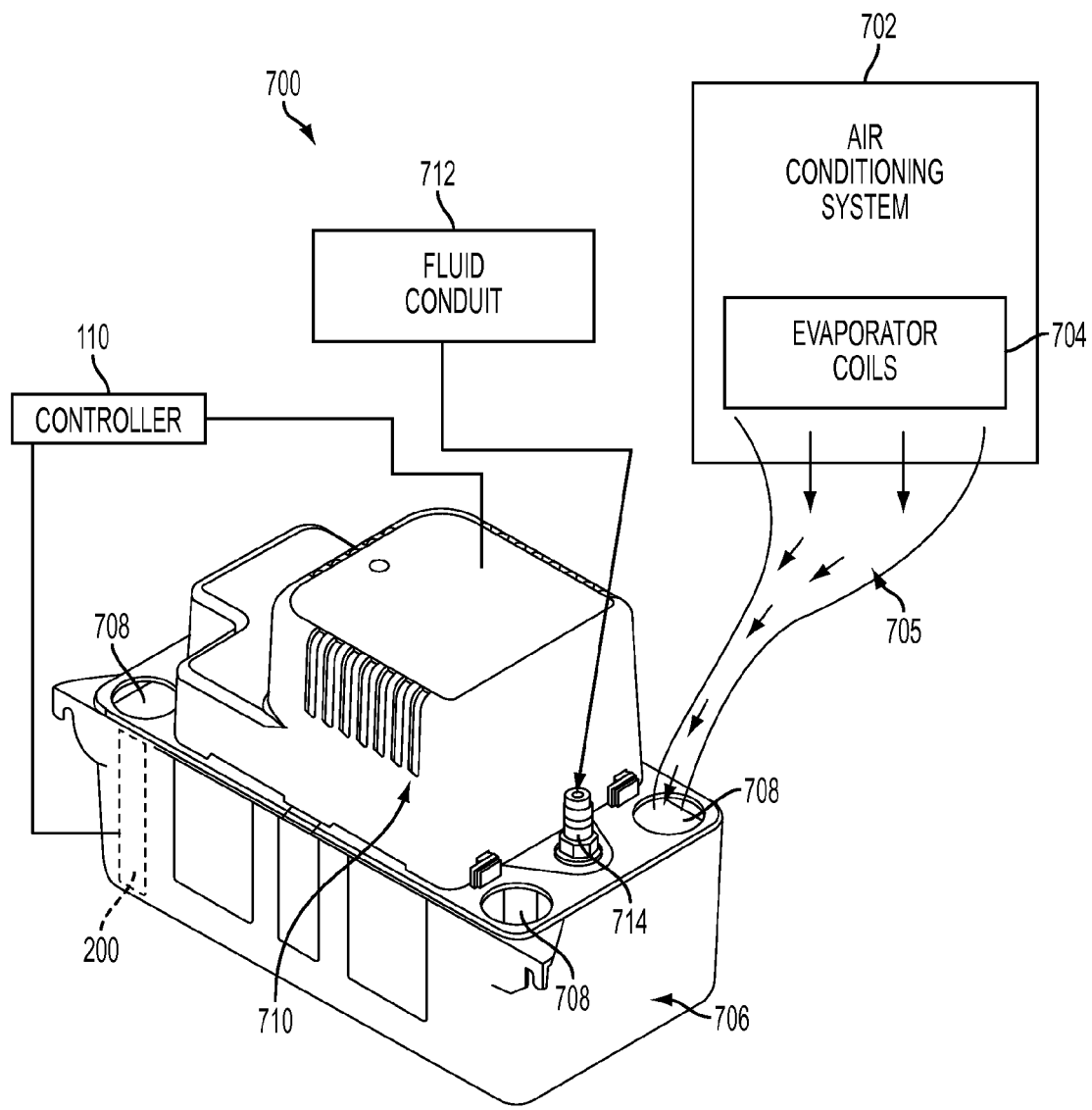
FIG. 18 illustrates a condensate system including a sensor module associated with an air conditioning system.

Referring to FIG. 18, an exemplary condensate system 700 is shown. Condensate system 700 is used with an air conditioning system 702. During the operation of air conditioning system 702, water 705 condenses on evaporator coils 704. Water 705 is typically cold. This water 705 is carried by a fluid conduit to a tank 706 of condensate system 700. In the illustrated embodiment, water 705 enters tank 706 through one or more of openings 708. Controller 110 monitors the level of water in tank 706 through sensor module 200. Controller 110 activates a pump 710 to remove water 705 from tank 706. Pump 710 communicates the water 705 to a fluid conduit 712 coupled to an outlet nozzle 714 of tank 706. In one embodiment, outlet nozzle 714 includes a check valve to prevent water 705 from reentering tank 706.

Figure 19:
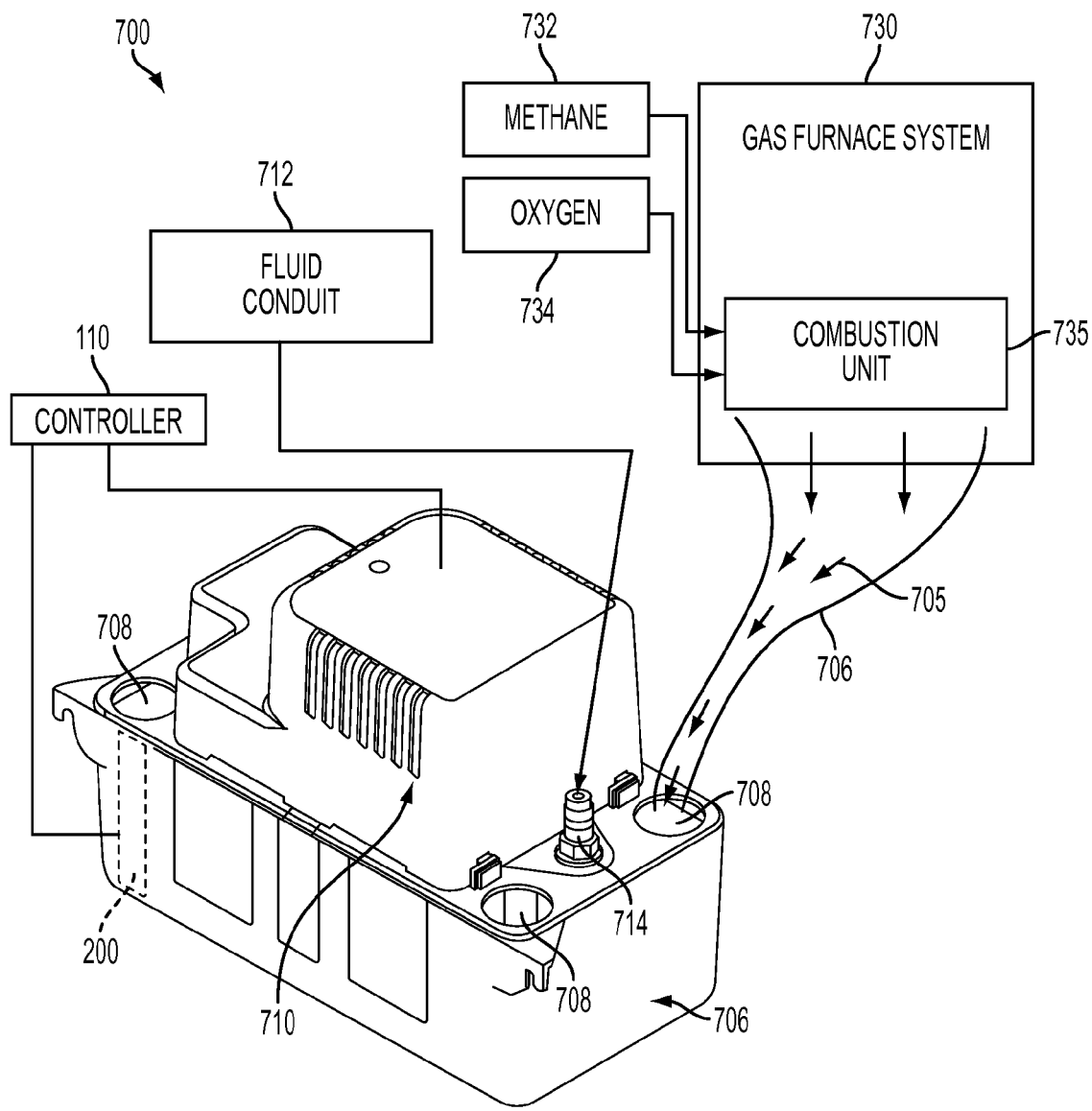
FIG. 19 illustrates a condensate system including a sensor module associated with a gas furnace system.

Referring to FIG. 19, condensate system 700 is shown receiving water 705 from a gas furnace system 730. The water 705 leaving gas furnace system 730 is hot water, potentially near the boiling point. During operation of gas furnace system 730 the water 705 is produced from the chemical reaction of burning methane 732 in the presence of oxygen 734 in a combustion unit 735. This reaction produces heat, carbon dioxide and water.

$$CH_4 + 2O_2 \rightarrow CO_2 + 2H_2O$$

Sensor module 200 is well suited to handle both cold water and hot water.

Figure 20:
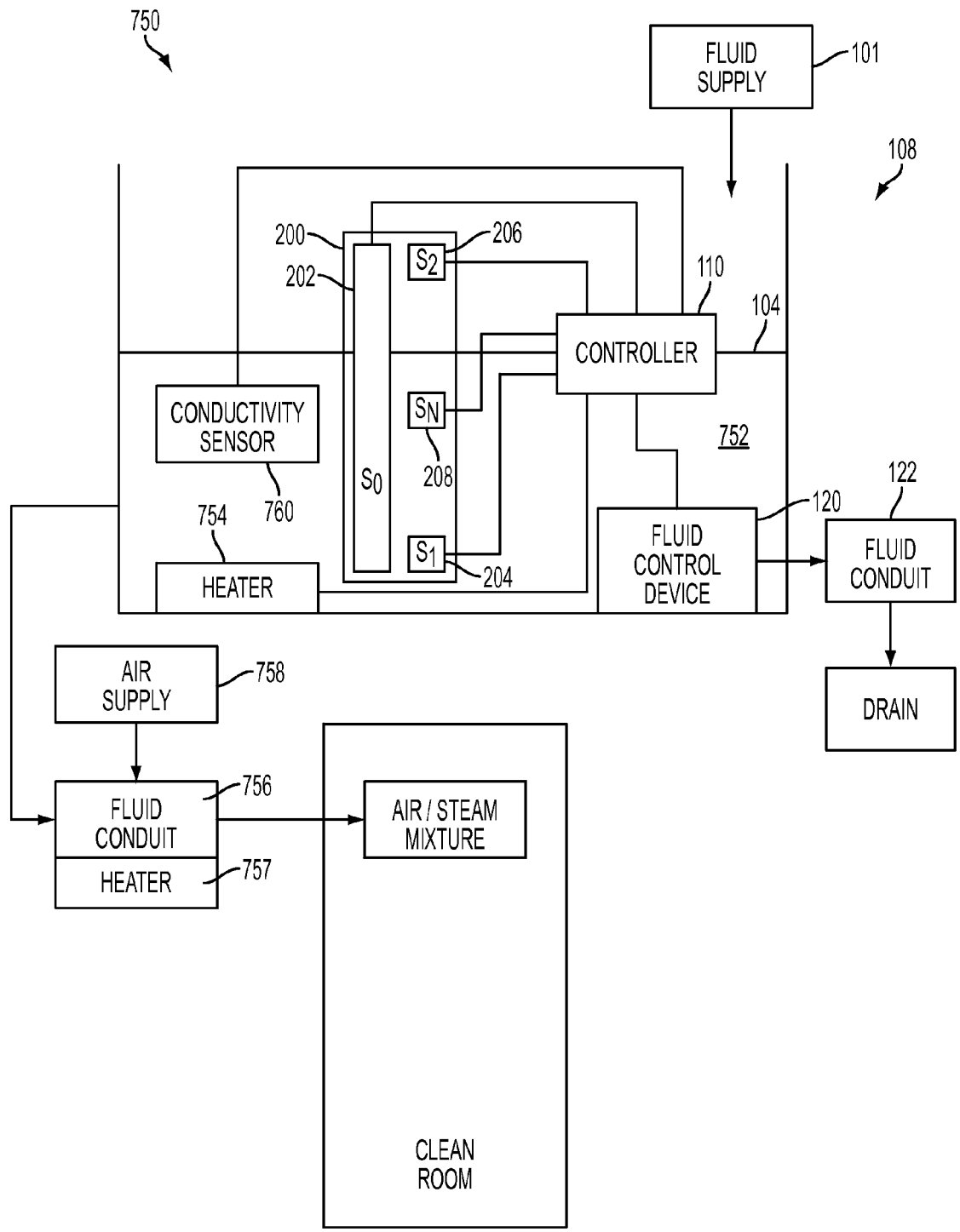
FIG. 20 illustrates an air humidifier system including a sensor module.

Referring to FIG. 20, an exemplary steam humidifier system 750 is shown. Steam humidifier systems may be used to provide moisture to a clean room environment. A typical steam humidifier system 750 has a supply tank, such as vessel 108, in which water 752 is heated to just under boiling with a heater 754. A small amount of water 752 is passed from the supply tank 108 to a fluid conduit 756 wherein it is heated with a heater 757 beyond the boiling point and added to an air stream from an air supply 758. The steam produced is relatively pure water. Over time the supply tank 108 builds up more and more minerals that do not escape through the steam. A conductivity sensor 760 is connected to the supply tank 108 to measure the conductivity of the water 752. As mineral content in the water 752 increases, the conductivity of the water 752 increases. Once the conductivity reaches a threshold value, controller 110 operates fluid control device 120 to purge vessel 108 down to a preset level and subsequently refill vessel 108 with fresh water up to a preset level. Controller 110 may also add fresh water as water is removed to fluid conduit 756 during normal operation of steam humidifier system 750. In one embodiment, the passage of water from vessel 108 to fluid conduit 756 is through another fluid control device 120 under the control of controller 110.

Figure 21:
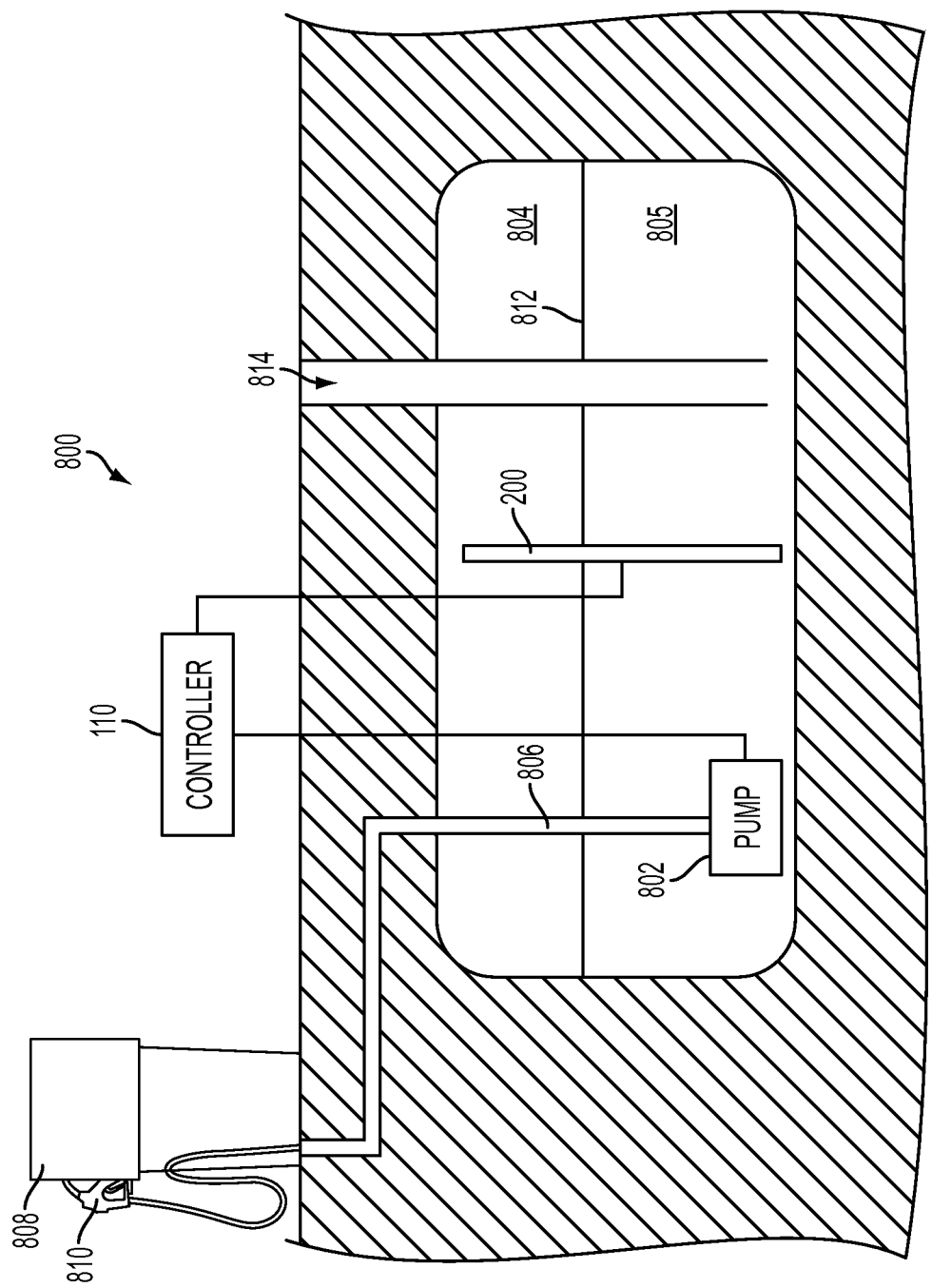
FIG. 21 illustrates a fuel dispensing system including a sensor module.

Referring to FIG. 21, an exemplary fuel filling system 800 is shown. In fuel filling system 800, a pump 802 is placed in an underground storage tank 804 that holds fuel 805. Exemplary fuels include gasoline, diesel, and other fuels. Pump 802 pumps fuel from underground storage tank 804 to a fuel dispensing unit 808 through a fluid conduit 806. The fuel is then communicated to a fuel tank of a vehicle or other container through a nozzle 810. As the fuel 805 is pumped to fuel dispensing unit 808 the level 812 of fuel 805 drops. Sensor module 200 may be monitored by controller 110 to determine a level of fuel 805. In addition, fuel 805 is added to underground storage tank 804 through a delivery fluid conduit 814. As fuel 805 is added, the level 812 is raised. Once again sensor module 200 may be monitored by controller 110 to determine the level 812 of fuel 805 as fuel 805 is being added. In one embodiment, sensor module 200 is coupled to an interior of underground storage tank 804. In one embodiment, sensor module 200 is coupled to an exterior of underground storage tank 804. In one embodiment, sensor module 200 is coupled to a support (not shown).

In one embodiment of the present disclosure, a method for determining the level of a fluid or other medium in a container is provided. The method may comprise arranging more than one electrode in an offset fashion substantially along the primary axis to be measured so as to be capacitively coupled with the medium, wherein the medium forms the dielectric of a capacitor, connecting one side of the electrodes so that they are in communication with the mutual charging circuit, connecting the opposing electrodes so that they are in communication with the electrical return circuit or analog common, the charging electrodes and the opposing electrodes forming a capacitive sensor with the medium to be measured as the dielectric, charging and discharging selectable electrodes in a controlled fashion so that the rise time and fall time are affected by the presence of the medium being sensed, passing the mutual connection of the sensor through an integrator circuit and recording the resulting voltage level as different combinations of (or single) electrodes are activated, analyzing the voltage result for different combinations of activated electrodes over time, and making decisions regarding the level of the medium based on the relative voltages for different electrode combinations.

The method may include evaluating the result over time to distinguish change events which can be used to calibrate the sensor.

The method may include using a variable charging resistor to allow for shifting the range of capacitance sensing.

The method may include incorporating a separate electrode at the bottom of the sensor as a control element to be covered by the medium whenever the medium is present wherein any contaminant/scale/slime/algae build up can be sensed and subtracted out of the main sensor input.

The method may include incorporating a calibration feature to adjust for changing conditions over time where a separate heating element and temperature sensing device is placed within the sensing region of the main sensor and by sensing the change in heat dissipation a secondary feedback as to the location of the medium is provided so as to adjust the readings from the main sensor.

The method may include incorporating a calibration feature to adjust for changing conditions over time where a mechanical float is placed within the sensing region of the main sensor and by switching a switch due to the rising of the float a secondary feedback as to the location of the medium is provided so as to adjust the readings from the main sensor.

The method may include incorporating a calibration feature to adjust for changing conditions over time where a pair of conductive probes are placed within the sensing region of the main sensor and by sensing the conductance through the medium a secondary feedback as to the location of the medium is provided so as to adjust the readings from the main sensor.

The method may include incorporating a calibration feature to adjust for changing conditions over time where a pressure transducer is placed within the sensing region of the main sensor and by sensing the pressure through the medium a secondary feedback as to the location of the medium is provided so as to adjust the readings from the main sensor.

In one embodiment of the present disclosure, an apparatus for determining the level of a fluid or other medium in a container is provided. The apparatus may comprise a sensor element consisting of various electrodes at different positions forming electric field generators, an electrical pulse generator, an electrical circuit that integrates the overall voltage level at the sensor over time, means for analyzing the voltage over time, means for determining the level of the medium based on the measured voltage, and means for activating control elements to respond to the determined level of the material.

In one embodiment of the present disclosure, a method for determining the level of a fluid or other medium in a container is provided. The method may comprise arranging more than one electrode in an offset fashion substantially along the primary axis to be measured so as to be capacitively coupled with the medium, wherein the medium forms the dielectric of a capacitor, connecting one side of the electrodes so that they are in communication with the mutual charging circuit, connecting the opposing electrodes so that they are in communication with the electrical return circuit or analog common, the charging electrodes and the opposing electrodes forming a capacitive sensor with the medium to be measured as the dielectric, charging and discharging selectable electrodes in a controlled fashion so that the rise time and fall time are affected by the presence of the medium being sensed, passing the mutual connection of the sensor through a current monitor circuit and recording the resulting current level as different combinations of (or single) electrodes are activated, analyzing the current result for different combinations of activated electrodes over time, and making decisions regarding the level of the medium based on the relative current for different electrode combinations.

The method may include evaluating the result over time to distinguish change events which can be used to calibrate the sensor.

The method may include using a variable charging resistor to allow for shifting the range of capacitance sensing.

The method may include incorporating a separate electrode at the bottom of the sensor as a control element to be covered by the medium whenever the medium is present wherein any contaminant/scale/slime/algae build up can be sensed and subtracted out of the main sensor input.

The method may include incorporating a calibration feature to adjust for changing conditions over time where a separate heating element and temperature sensing device is placed within the sensing region of the main sensor and by sensing the change in heat dissipation a secondary feedback as to the location of the medium is provided so as to adjust the readings from the main sensor.

The method may include incorporating a calibration feature to adjust for changing conditions over time where a mechanical float is placed within the sensing region of the main sensor and by switching a switch due to the rising of the float a secondary feedback as to the location of the medium is provided so as to adjust the readings from the main sensor.

The method may include incorporating a calibration feature to adjust for changing conditions over time where a pressure transducer is placed within the sensing region of the main sensor and by sensing the pressure through the medium a secondary feedback as to the location of the medium is provided so as to adjust the readings from the main sensor.

The method may include incorporating a calibration feature to adjust for changing conditions over time where a pair of conductive probes are placed within the sensing region of the main sensor and by sensing the conductance through the medium a secondary feedback as to the location of the medium is provided so as to adjust the readings from the main sensor.

In one embodiment of the present disclosure, an apparatus for determining the level of a fluid or other medium in a container is provided. The apparatus may comprise a sensor element consisting of various electrodes at different positions forming electric field generators, an electrical pulse generator, an electrical circuit that monitors the overall current through the sensor(s) over time, means for analyzing the current over time, means for determining the level of the medium based on the measured current, and means for activating control elements to respond to the determined level of the material.

Although the invention has been described in detail with reference to certain preferred embodiments, variations and modifications exist within the spirit and scope of the invention as described and defined in the following claims.

What is claimed is:

1. A method of controlling a level of a material in a vessel, the method comprising the steps of:
   placing at least two capacitive sensors proximate to the material in the vessel, a first capacitive sensor arranged to monitor a first range of levels in the vessel and a second capacitive sensor arranged to monitor at least a first level in the vessel, the first level being a part of the first range of levels;
   monitoring an output of the first capacitive sensor;
   monitoring an output of the second capacitive sensor; and
   determining a current level of the material in the vessel based on the output of the first capacitive sensor and the output of the second capacitive sensor, the output of the second capacitive sensor being used to improve an accuracy of the determined current level.

2. The method of claim 1, wherein the first level is at an endpoint of the first range of levels.

3. The method of claim 1, wherein the first level is between a first endpoint and a second endpoint of the first range of levels.

4. The method of claim 1, further comprising the step automatically adjusting an amount of material in the vessel based on the current level when the current level corresponds to a control event.

5. The method of claim 4, wherein the amount of material in the vessel is reduced when the current level corresponds to the control event.

6. The method of claim 5, wherein a controller determines if the current level corresponds to the control event and in response thereto activates a material control device to reduce the amount of material in the vessel.

7. The method of claim 4, wherein the amount of material in the vessel is increased when the current level corresponds to the control event.

8. The method of claim 7, wherein a controller determines if the current level corresponds to the control event and in response thereto activates a material control device to increase the amount of material in the vessel.

9. The method of claim 1, wherein the material is flowable material.

10. The method of claim 1, wherein the material is fluid.

11. The method of claim 1, wherein a controller determines if the current level corresponds to an alarm event and in response thereto provides an indication to an alarm device.

12. The method of claim 1, wherein the controller includes an analog circuit and the step of monitoring an output of the first capacitive sensor includes the step of integrating a voltage associated with the first capacitive sensor over time.

13. The method of claim 1, wherein the controller includes an analog circuit and the step of monitoring an output of the second capacitive sensor includes the steps of integrating a voltage associated with the second capacitive sensor over time; comparing the integrated voltage to a threshold voltage.

14. The method of claim 1, wherein the controller based on whether the integrated voltage crosses the threshold voltage determines a correction for a monitored voltage associated with the first capacitive sensor.

15. The method of claim 1, wherein the first range of levels is a variable range.

16. The method of claim 15, further comprising the step of setting an endpoint of the first range of levels based on at least one user input.

17. The method of claim 1, further comprising the steps of:
   powering up a power circuit when the current level approaches a level corresponding to a control event; and
   automatically adjusting an amount of material in the vessel based on the current level when the current level reaches the level corresponding to the control event.

18. The method of claim 1, further comprising the steps of:
   automatically adjusting an amount of material in the vessel with a material control device based on the current level when the current level has moved in a first direction and corresponds to a control event;
   determining if the current level continues to move in the first direction while the material control device is active; and
   if the current level continues to move in the first direction provide an indication to an alarm device.

19. The method of claim 1, wherein the first range of levels includes a first end and a second end and the first level is spaced apart from the first end and the second end.

20. A method of controlling a level of a material in a vessel, the method comprising the steps of:
   placing at least three capacitive sensors proximate to the material in the vessel, a first capacitive sensor arranged to monitor a first range of levels in the vessel, a second capacitive sensor arranged to monitor at least a first level in the vessel, the first level being a part of the first range of levels, and a third capacitive sensor arranged to monitor at least a second level in the vessel, the second level being a part of the first range of levels;
   monitoring an output of the first capacitive sensor;
   determining a level of the material based on the output of the first capacitive sensor;
   monitoring an output of the second capacitive sensor when the determined level is proximate to the first level in the vessel;
   monitoring an output of the third capacitive sensor when the determined level is proximate to the second level in the vessel; and
   determining a current level of the material in the vessel based on the output of the first capacitive sensor and at least one of the output of the second capacitive sensor when the determined level is proximate to the first level in the vessel and the output of the third capacitive sensor when the determined level is proximate to the second level in the vessel, the output of the second capacitive sensor and the output of the third capacitive sensor being used to improve an accuracy of the determined current level.

21. The method of claim 20, further comprising the step automatically adjusting an amount of material in the vessel based on the current level when the current level corresponds to a control event.

22. The method of claim 20, wherein the first range of levels includes a first end and a second end and the first level is spaced apart from the first end and the second end.

23. An apparatus for controlling a level of a material in a vessel, the apparatus comprising:
   a first capacitive sensor arranged to monitor a first range of levels in the vessel;
   a second capacitive sensor arranged to monitor at least a first level in the vessel, the first level being a part of the first range of levels;
   a controller operatively coupled to the first capacitive sensor and the second capacitive sensor; and
   a material control device operatively coupled to the controller, the material control device having a first configuration wherein a fluid conduit external to the vessel is not in fluid communication with an interior of the vessel and a second configuration wherein the fluid conduit external to the vessel is in fluid communication with the interior of the vessel, the controller changing the configuration of the material control device based on an output of the first capacitive sensor and an output of the second capacitive sensor, the output of the second capacitive sensor being used to improve an accuracy of the determined current level.

24. The apparatus of claim 23, wherein the material control device removes material from the interior of the vessel in the second configuration.

25. The apparatus of claim 24, wherein the material control device is a pump.

26. The apparatus of claim 24, wherein the material control device is a valve.

27. The apparatus of claim 23, wherein the material control device adds material to the interior of the vessel in the second configuration.

28. The apparatus of claim 27, wherein the material control device is a valve.

29. The apparatus of claim 27, wherein the material control device is a pump.

30. The apparatus of claim 27, further comprising a non-capacitive sensor arranged to monitor at least a second level in the vessel, the second level being a part of the first range of levels.

31. The apparatus of claim 30, wherein the non-capacitive sensor is selected from the group of a mechanical float; a heat sensor; a conductive probe, and a pressure sensor.

32. The apparatus of claim 31, wherein the second level is spaced apart from the first level.

33. The apparatus of claim 31, wherein the second level is equal to the first level.

34. The method of claim 23, wherein the first range of levels includes a first end and a second end and the first level is spaced apart from the first end and the second end.

* * * * *